(12) United States Patent
Kikuchi

(10) Patent No.: US 8,730,371 B2
(45) Date of Patent: May 20, 2014

(54) IMAGE PROCESSING APPARATUS AND IMAGE PROCESSING METHOD, AND DATA PROCESSING APPARATUS AND DATA PROCESSING METHOD

(75) Inventor: Tomoe Kikuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 449 days.

(21) Appl. No.: 13/122,421

(22) PCT Filed: Nov. 26, 2009

(86) PCT No.: PCT/JP2009/070273
§ 371 (c)(1),
(2), (4) Date: Apr. 4, 2011

(87) PCT Pub. No.: WO2010/067740
PCT Pub. Date: Jun. 17, 2010

(65) Prior Publication Data
US 2011/0187874 A1 Aug. 4, 2011

(30) Foreign Application Priority Data

Dec. 10, 2008 (JP) ................................. 2008-315031

(51) Int. Cl.
*H04N 5/225* (2006.01)
*H04N 5/228* (2006.01)
(52) U.S. Cl.
USPC ....................................... 348/340; 348/222.1
(58) Field of Classification Search
USPC ............. 348/27.1, 207.9, 241, 272, 345, 340, 348/251, 349, 207.1, 207.99, 335, 222.1; 382/254, 167
See application file for complete search history.

(56) References Cited

U.S. PATENT DOCUMENTS

| | | | |
|---|---|---|---|
| 6,061,494 A | 5/2000 | Kikuchi | |
| 6,100,929 A * | 8/2000 | Ikeda et al. | 348/262 |
| 6,243,529 B1 | 6/2001 | Takayama et al. | |
| 6,421,498 B1 | 7/2002 | Fukuoka et al. | |
| 6,822,758 B1 | 11/2004 | Morino | |
| 7,884,863 B2 | 2/2011 | Nakami et al. | |
| 7,916,194 B2 * | 3/2011 | Hayashi et al. | 348/294 |
| 7,990,438 B2 | 8/2011 | Kamo | |

(Continued)

FOREIGN PATENT DOCUMENTS

| | | |
|---|---|---|
| CN | 1794783 A | 6/2006 |
| CN | 101222583 A | 7/2008 |

(Continued)

OTHER PUBLICATIONS

Dec. 11, 2012 European Search Report in European Patent Appln. No. 09831844.7.

(Continued)

*Primary Examiner* — Ahmed A Berhan
(74) *Attorney, Agent, or Firm* — Fitzpatrick, Cella, Harper & Scinto

(57) ABSTRACT

Optical transfer information of an imaging lens is input from the imaging lens, and characteristic information of an image capturing unit of an image capturing apparatus is acquired. The optical transfer information is converted into that, which depends on the characteristics of the image capturing unit, based on the characteristic information. A correction filter, which corrects degradation of an image captured via the imaging lens, is generated based on the optical transfer information which depends on the characteristics of the image capturing unit.

19 Claims, 17 Drawing Sheets

(56) References Cited

U.S. PATENT DOCUMENTS

| | | | |
|---|---|---|---|
| 8,089,546 B2 * | 1/2012 | Omaki et al. | 348/333.01 |
| 2004/0212692 A1 | 10/2004 | Nakami et al. | |
| 2008/0007797 A1 * | 1/2008 | Hayashi et al. | 358/474 |
| 2008/0088728 A1 * | 4/2008 | Omaki et al. | 348/333.01 |
| 2008/0165261 A1 | 7/2008 | Kamo | |
| 2008/0172411 A1 | 7/2008 | Kikuchi | |
| 2008/0239099 A1 | 10/2008 | Abe | |
| 2009/0262231 A1 | 10/2009 | Murata et al. | |
| 2010/0045802 A1 | 2/2010 | Oda et al. | |
| 2011/0096176 A1 | 4/2011 | Nakami et al. | |

FOREIGN PATENT DOCUMENTS

| | | |
|---|---|---|
| CN | 101258740 A | 9/2008 |
| CN | 101523890 A | 9/2009 |
| EP | 2 086 220 A1 | 8/2009 |
| JP | 62-127976 A | 6/1987 |
| JP | 4-088765 A | 3/1992 |
| JP | 2000-020691 A | 1/2000 |
| JP | 2001-223979 A | 8/2001 |
| JP | 2003-051979 A | 2/2003 |
| JP | 2003-189236 A | 7/2003 |
| JP | 2003-244621 A | 8/2003 |
| JP | 2004-205802 A | 7/2004 |
| WO | 2008/044591 A1 | 4/2008 |
| WO | 2008/081575 A1 | 7/2008 |

OTHER PUBLICATIONS

Alain Briot, "DxO Optics Pro v5—A Review & Tutorial", Internet Citation, Feb. 2008, pp. 1-20, XP002598293, URL: http://www.dxo.com/var/dxo/storage/original/application/59ec5161f7ec8b53382580477f6ddb0d.pdf.

Feb. 23, 2010 International Search Report and Written Opinion in International Patent Appln. No. PCT/JP2009/070273.

Jun. 18, 2013 Chinese Official Action in Chinese Patent Appln. No. 200980149785.6.

* cited by examiner

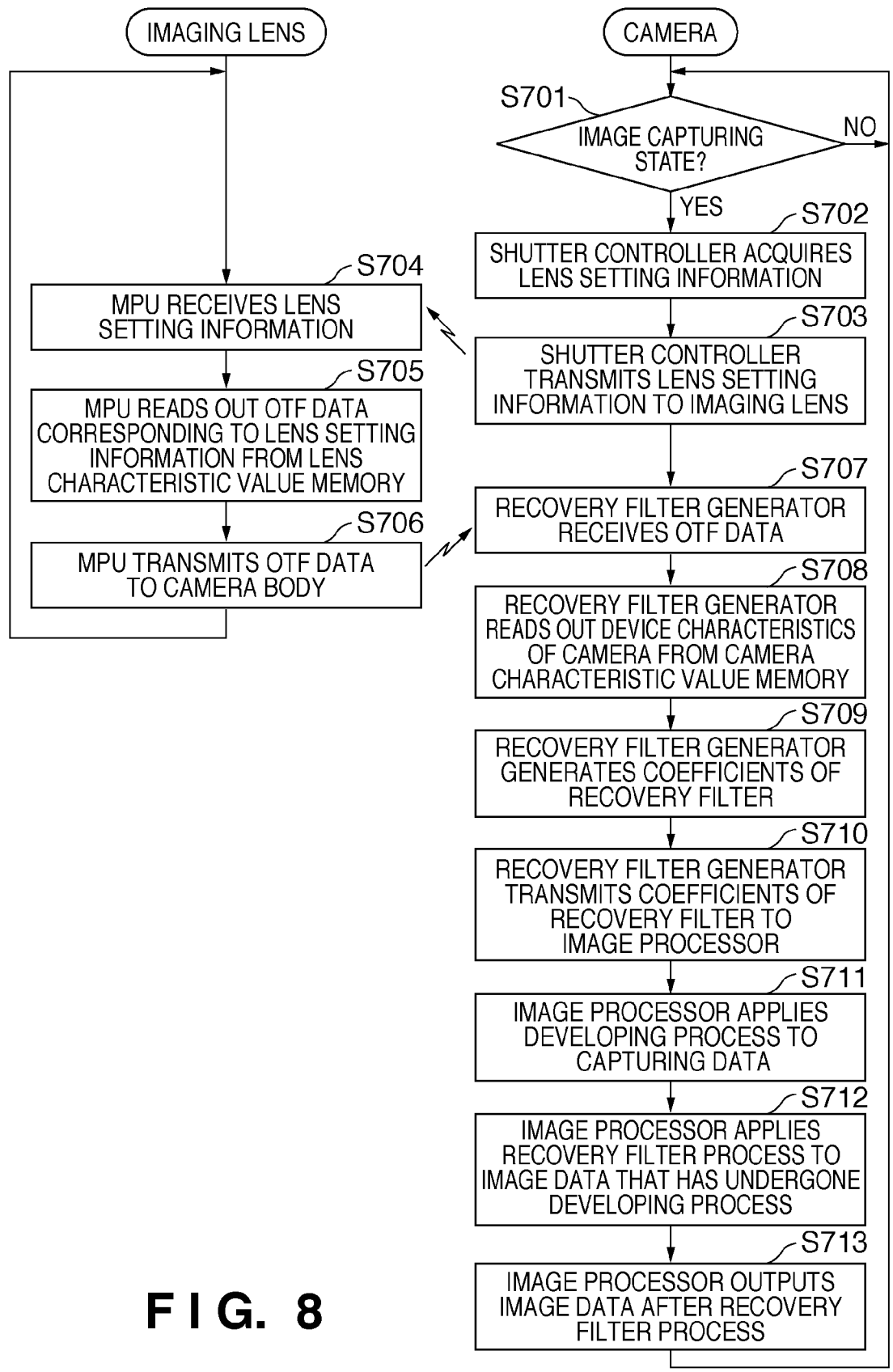
F I G. 8

F I G. 11
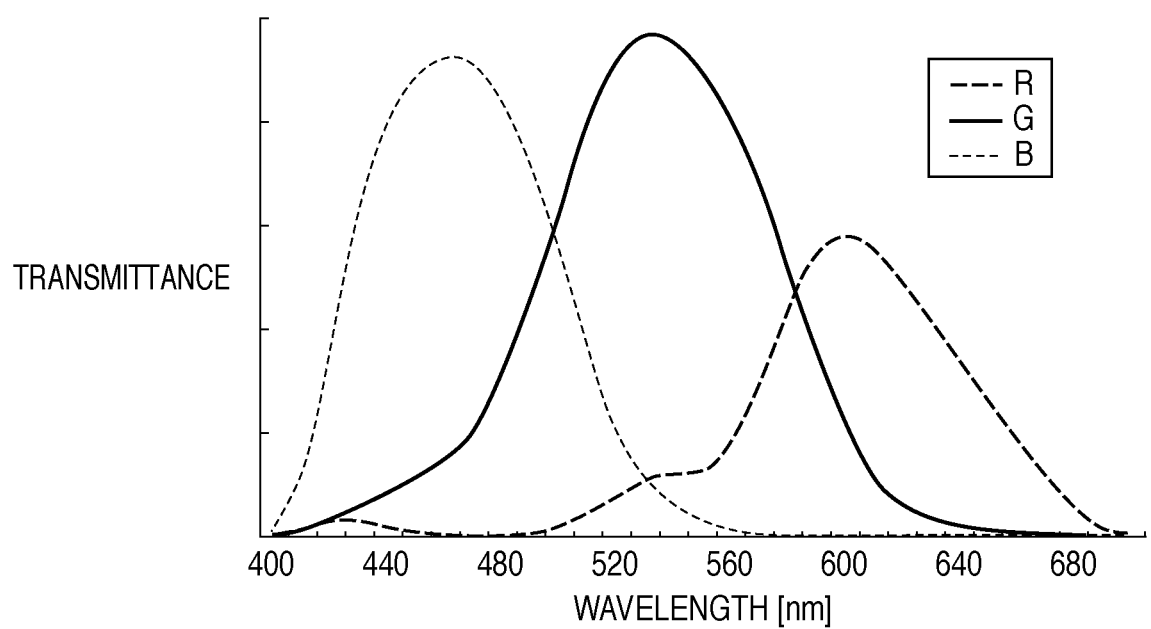

FIG. 17

| ZOOM POSITION | F-VALUE | IMAGING DISTANCE [mm] | OTF GROUP ADDRESS | |
|---|---|---|---|---|
| 0 | 2.8 | ∞ | 0x0001F3D1 | ←1701 |
| | | 2500 | 0x0001F3D1 | |
| | | 1250 | 0x0001F3D1 | |
| | | 625 | 0x00071A87 | |
| | | 400 | 0x000C413D | |
| | | ⋮ | ⋮ | |
| | 3.5 | ∞ | 0x000F350E | |
| | | 2500 | 0x000F350E | |
| | | 1250 | 0x000F350E | |
| | | 625 | 0x00145BC4 | |
| | | 400 | 0x001A8A38 | |
| | | ⋮ | ⋮ | |
| 1 | 2.8 | ∞ | 0x00B1F3D3 | |
| | | 2500 | 0x00B1F3D3 | |
| | | 1250 | 0x00B1F3D3 | |
| | | 625 | 0x001A8A38 | |
| | | 400 | 0x00B79E68 | |
| | | ⋮ | ⋮ | |
| | ⋮ | ⋮ | ⋮ | |
| ⋮ | ⋮ | ⋮ | ⋮ | |

IMAGE PROCESSING APPARATUS AND IMAGE PROCESSING METHOD, AND DATA PROCESSING APPARATUS AND DATA PROCESSING METHOD

TECHNICAL FIELD

The present invention relates to an image processing apparatus and image processing method, and a data processing apparatus and data processing method, which correct a degraded captured image.

BACKGROUND ART

A known image recovery process recovers an image free from any degradation when an image captured by an image capturing apparatus, such as a digital still camera, suffers degradation caused by, for example, aberrations. As an image recovery algorithm, a method is known that expresses image degradation characteristics by a point spread function (PSF) and recovers an image free from any degradation based on the PSF.

Japanese Patent Laid-Open No. 62-127976 discloses an invention that corrects blur by a filtering process having the inverse characteristics of the PSF. Also, Japanese Patent Laid-Open No. 2004-205802 discloses an invention that generates a Wiener filter from the PSF, and recovers a degraded image using the Wiener filter. Furthermore, Japanese Patent Laid-Open No. 2000-020691 discloses an invention that obtains a high-quality recovered image using characteristic information of an image capturing apparatus.

[Principle of Image Recovery]

Let (x, y) be position coordinates on a frame, let o(x, y) be an image free from any degradation (to be referred to as a subject image hereinafter), let z(x, y) be an image which is degraded due to an out-of-focus condition, aberrations, camera shaking, and so forth (to be referred to as a degraded image hereinafter), and let p(x, y) be information of a PSF of a point spread due to blur. These three pieces of information satisfy:

$$z(x,y)=o(x,y)*p(x,y) \quad (1)$$

In the equation (1), the symbol "*" represents a convolution operation. Therefore, equation (1) can be rewritten as an integral formula expressed by:

$$z(x,y)=\iint o(x,y)p(x-x',y-y')dx'dy' \quad (2)$$

The Fourier transform of equation (2) onto a spatial frequency (u, v) domain is computed as:

$$Z(u,v)=O(u,v) \cdot P(u,v) \quad (3)$$

where
Z(u, v) is the spectrum of z(x, y),
O(u, v) is the spectrum of o(x, y), and
P(u, v) is the spectrum of p(x, y).

Note that P(u, v) is a modulation transfer function (MTF) as the absolute value of an optical transfer function (OTF) as the two-dimensional Fourier transform of the PSF.

If p(x, y) as the PSF can be detected by an arbitrary method in addition to the degraded image z(x, y), the spectrum O(u, v) of the subject image can be calculated by calculating their spectra and using equation (4) obtained by modifying equation (3). Then, by computing the inverse Fourier transform of the spectrum calculated by equation (4), the subject image o(x, y) can be obtained.

$$O(u,v)=Z(u,v)/P(u,v) \quad (4)$$

Note that 1/P(u, v) is called an inverse filter.

The MTF of the degradation often includes a frequency where its value becomes zero. The zero MTF value means there exists a frequency component that is not transmitted (information is lost) by degradation. If a frequency where the MTF value becomes zero exists, the subject image cannot be perfectly recovered. Therefore, the inverse filter of the MTF often includes a frequency at which a filter coefficient becomes infinity, and the spectrum value of the subject image becomes indefinite at that frequency.

In order to prevent an inverse filter coefficient from becoming infinity, image recovery often uses a Wiener filter expressed by:

$$P(u,v)/\{|P(u,v)|^2+c\} \quad (5)$$

where c is a constant having a very small value.

In order to recover the subject image from the degraded image, acquisition of an accurate PSF (or OTF, MTF) is desired.

As is well known, the PSF changes, depending on the image height, the zoom, the stop, and the subject position. Therefore, a method of calculating the PSF according to these pieces of imaging information and feeding it back to the recovery process has been proposed. For example, Japanese Patent Laid-Open No. 4-088765 estimates the PSF according to the subject distance, and uses it in the recovery of image degradation. Japanese Patent Laid-Open No. 2000-020691 executes a recovery process by correcting the PSF at the time of use of a flash by focusing attention on the fact that a luminance change of a subject during a shutter-open period is large at the time of use of the flash and is different from the PSF during the shutter-open period when the flash is not used (luminance change is uniform).

Recovery process methods are disclosed in various references. However, in practice, these references have never discussed what holds data of a recovery filter, what kind of information is to be held, how to hold the data, and how to create a recovery filter using it. In particular, there is no discussion which assumes a single-lens reflex camera using interchangeable imaging lenses and considers a plurality of combinations of imaging lenses and a camera body.

As a simplest method, recovery-process information (recovery filter coefficients, PSF data of the overall image capturing apparatus, etc.) of an overall image capturing apparatus including imaging lenses and a camera body is stored as a database in a camera body or image process software. Then, upon execution of a recovery process, recovery-process information according to imaging conditions need only be acquired from the database.

The aforementioned method is effective for a digital camera having a fixed combination of an imaging lens and a camera body. However, in case of a single-lens reflex camera using interchangeable imaging lenses, pieces of recovery-process information have to be held in correspondence with all combinations of the imaging lenses and the camera body. In this case, the amount of data becomes very large, and it is difficult for each imaging lens or camera body having a limited memory size to hold the recovery-process information. The recovery-process information is fixed data corresponding to a combination of a certain imaging lens and the camera body. For this reason, every time a new model of a camera body or imaging lens appears, recovery-process information corresponding to a combination of the new model and the existing model has to be created, and the new recovery-process information has to be reflected in the existing database. Such an operation forces the users of camera bodies and imaging lenses perform cumbersome operations.

DISCLOSURE OF INVENTION

According to one aspect, an image processing apparatus for an image capturing apparatus using an interchangeable imaging lens, comprises: an input section, configured to input optical transfer information of the imaging lens from the imaging lens; an acquisition section, configured to acquire characteristic information of an image capturing unit of the image capturing apparatus; a converter, configured to convert the optical transfer information into optical transfer information that depends on characteristics of the image capturing unit, based on the characteristic information; and a generator, configured to generate a correction filter, which corrects degradation of an image captured via the imaging lens, based on the optical transfer information that depends on the characteristics of the image capturing unit.

According to another aspect, an image processing apparatus for an image capturing apparatus using an interchangeable imaging lens, comprises: an input section, configured to input optical transfer information of the imaging lens from the imaging lens; an acquisition section, configured to acquire characteristic information of an image capturing unit of the image capturing apparatus; and an output section, configured to output a file which saves the optical transfer information, the characteristic information, and capturing data captured via the imaging lens.

According to another aspect, an image processing apparatus for an image capturing apparatus using an interchangeable imaging lens, comprises: an input section, configured to input optical transfer information of the imaging lens from the imaging lens; an acquisition section, configured to acquire characteristic information of an image capturing unit of the image capturing apparatus; a converter, configured to convert the optical transfer information into optical transfer information that depends on characteristics of the image capturing unit, based on the characteristic information; and a generator, configured to generate a correction filter based on the optical transfer information that depends on the characteristics of the image capturing unit; and an output section, configured to selectively execute, according to an imaging mode of the image capturing apparatus, outputting of image data obtained by correcting degradation of an image captured via the imaging lens using the correction filter, or outputting of a file which saves the optical transfer information, the characteristic information, and capturing data captured via the imaging lens.

According to another aspect, a data processing apparatus for an interchangeable imaging lens of an image capturing apparatus, comprises: a receiver, configured to receive characteristic information of an image capturing unit of the image capturing apparatus; an acquisition section, configured to acquire optical transfer information according to a lens setting of the imaging lens; a converter, configured to convert the optical transfer information into optical transfer information that depends on characteristics of the image capturing unit, based on the characteristic information; a generator, configured to generate a correction filter, which corrects degradation of an image captured via the imaging lens, based on the optical transfer information that depends on the characteristics of the image capturing unit; and a transmitter, configured to transmit the correction filter to the image capturing apparatus.

According to another aspect, an image processing method of an image capturing apparatus using an interchangeable imaging lens, comprises the steps of: inputting optical transfer information of the imaging lens from the imaging lens; acquiring characteristic information of an image capturing unit of the image capturing apparatus; converting the optical transfer information into optical transfer information that depends on characteristics of the image capturing unit, based on the characteristic information; and generating a correction filter, which corrects degradation of an image captured via the imaging lens, based on the optical transfer information that depends on the characteristics of the image capturing unit.

According to another aspect, an image processing method of an image capturing apparatus using an interchangeable imaging lens, comprises the steps of: inputting optical transfer information of the imaging lens from the imaging lens; acquiring characteristic information of an image capturing unit of the image capturing apparatus; and outputting a file which saves the optical transfer information, the characteristic information, and capturing data captured via the imaging lens.

According to another aspect, an image processing method of an image capturing apparatus using an interchangeable imaging lens, comprises the steps of: inputting optical transfer information of the imaging lens from the imaging lens; acquiring characteristic information of an image capturing unit of the image capturing apparatus; converting the optical transfer information into optical transfer information that depends on characteristics of the image capturing unit, based on the characteristic information; and generating a correction filter based on the optical transfer information that depends on the characteristics of the image capturing unit; and selectively executing, according to an imaging mode of the image capturing apparatus, outputting of image data obtained by correcting degradation of an image captured via the imaging lens using the correction filter, or outputting of a file which saves the optical transfer information, the characteristic information, and capturing data captured via the imaging lens.

According to another aspect, a method of a data processing apparatus for an interchangeable imaging lens of an image capturing apparatus, comprises the steps of: receiving characteristic information of an image capturing unit of the image capturing apparatus; acquiring optical transfer information according to a lens setting of the imaging lens; converting the optical transfer information into optical transfer information that depends on characteristics of the image capturing unit, based on the characteristic information; generating a correction filter, which corrects degradation of an image captured via the imaging lens, based on the optical transfer information that depends on the characteristics of the image capturing unit; and transmitting the correction filter to the image capturing apparatus.

According to these aspects, degradation of an image captured by an image capturing apparatus which uses an interchangeable imaging lens can be corrected.

Further features of the present invention will become apparent from the following description of exemplary embodiments with reference to the attached drawings.

BRIEF DESCRIPTION OF DRAWINGS

FIG. 8 is a flowchart for explaining a recovery process.

FIG. 11 is a graph showing an example of spectral transmittance characteristics of RGB filters.

FIG. 17 is a view showing the concept of a data structure held by a lens characteristic value memory according to the fifth embodiment.

BEST MODE FOR CARRYING OUT THE INVENTION

An image processing apparatus and image processing method, and a data processing apparatus and data processing method according to embodiments of the present invention will be described in detail hereinafter with reference to the drawings.

First Embodiment

Arrangement of Camera

Figure 1:
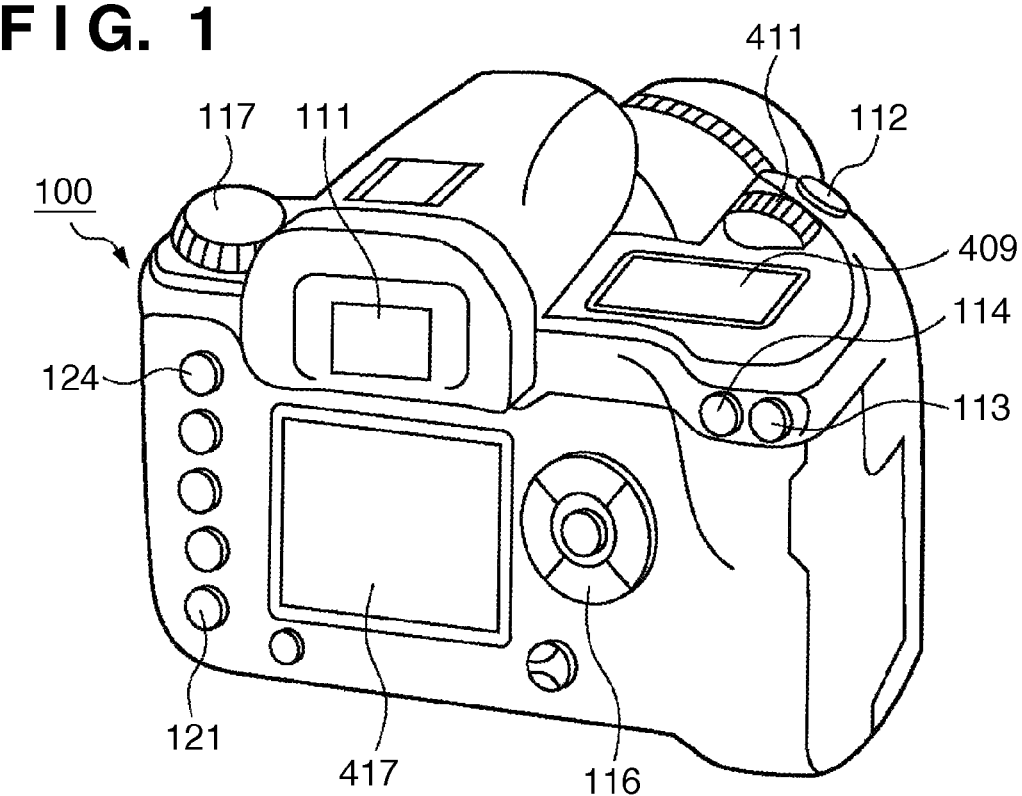
FIG. 1 is a view showing the outer appearance of a digital camera.

FIG. 1 shows the outer appearance of a digital camera.

On an upper portion of a camera body 100, a viewfinder eyepiece 111, an auto-exposure (AE) lock button 114, a button 113 used to select auto-focus (AF) points, and a release button 112 used to start an image capturing operation are arranged. Also, an imaging mode selection dial 117, a display unit 409, a digital dial 411, and the like are arranged.

The digital dial 411 serves as a multi-function signal input unit used to input a numerical value and to switch an imaging mode together with other operation buttons. The display unit 409 of an LCD panel displays imaging conditions, such as a shutter speed, stop, and imaging mode, and other kinds of information.

On the back surface of the camera body 100, a liquid crystal display (LCD) monitor 417, which displays an image captured by the camera, a capturing image, various setting screens, and the like, a switch 121 used to turn on/off display of the LCD monitor 417, cross keys 116, a menu button 124, and the like are arranged. Since the LCD monitor 417 is of transmission type, the user cannot view an image by driving only the LCD monitor 417. For this reason, a backlight is required on the rear surface of the LCD monitor 417, as will be described later.

The cross keys 116 have four buttons laid out at upper, lower, right, and left positions, and a setting button laid out at the central position, and is used to select and to instruct execution of menu items displayed on the LCD monitor 417.

The menu button 124 is used to display a menu screen on the LCD monitor 417. For example, when the user wants to select and set an imaging mode, he or she presses the menu button 124, selects a desired imaging mode by operating the upper, lower, right, and left buttons of the cross keys 116, and then presses the setting button while the desired imaging mode is selected, thus completing the setting of the imaging mode. Note that the menu button 124 and cross keys 116 are also used to set an AF mode (to be described later).

Figure 2:
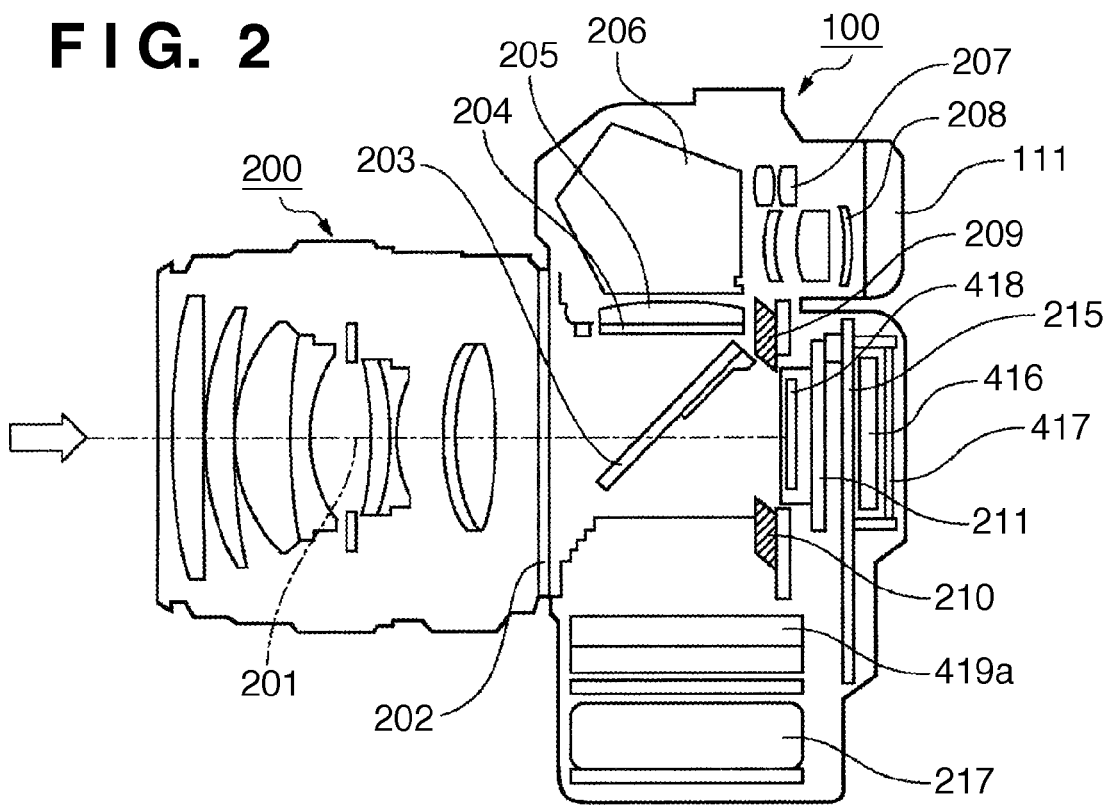
FIG. 2 is a longitudinal sectional view of the digital camera.

FIG. 2 is a longitudinal sectional view of the digital camera.

An imaging lens 200 of an imaging optical system is an interchangeable lens for the camera body 100, the imaging lens 200 is attachable to and detachable from the camera body via a lens mount 202.

A mirror 203, which is laid out in an imaging optical path having an imaging optical axis 201 as the center, can be quickly returned between a position where it guides subject light from the imaging lens 200 to a viewfinder optical system (slant position) and an escape position outside the imaging optical path.

The subject light guided to the viewfinder optical system by the mirror 203 forms an image on a focusing screen 204. The subject light that has been transmitted through the focusing screen 204 passes through a condenser lens 205 and pentagonal roof prism 206, which are arranged to enhance the visibility of a viewfinder, and is guided to an eyepiece lens 208 and photometry sensor 207.

A first curtain 210 and second curtain 209 form a focal plane shutter (mechanical shutter), and are opened and closed to expose, for a required period of time, an image capturing device 418 as a charge coupled device (CCD) or CMOS sensor, which is laid out behind these curtains. The image capturing device 418 is held on a printed circuit board 211. Another printed circuit board 215 is laid out behind the printed circuit board 211, and the LCD monitor 417 and a backlight 416 are arranged on the opposite surface of the printed circuit board 215.

Figure 3:
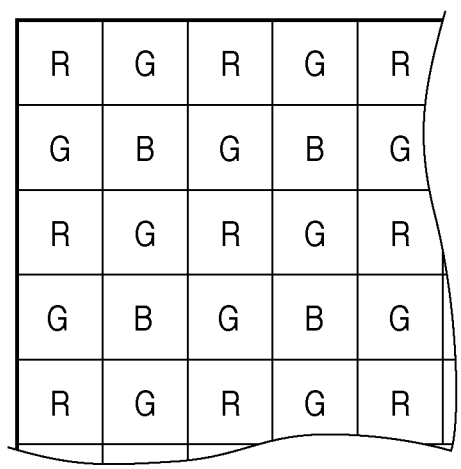
FIG. 3 is a view showing the configuration of an image capturing device.

FIG. 3 is a view showing the configuration of the image capturing device 418. The image capturing device 418 is of single-plate type, and the layout of color filters has a typical Bayer matrix.

Furthermore, the camera body 100 includes a recording medium 419a on which image data are recorded, and a battery 217 as a portable power supply. Note that the recording medium 419a and the battery 217 are detachable from the camera body 100.

Figure 4:
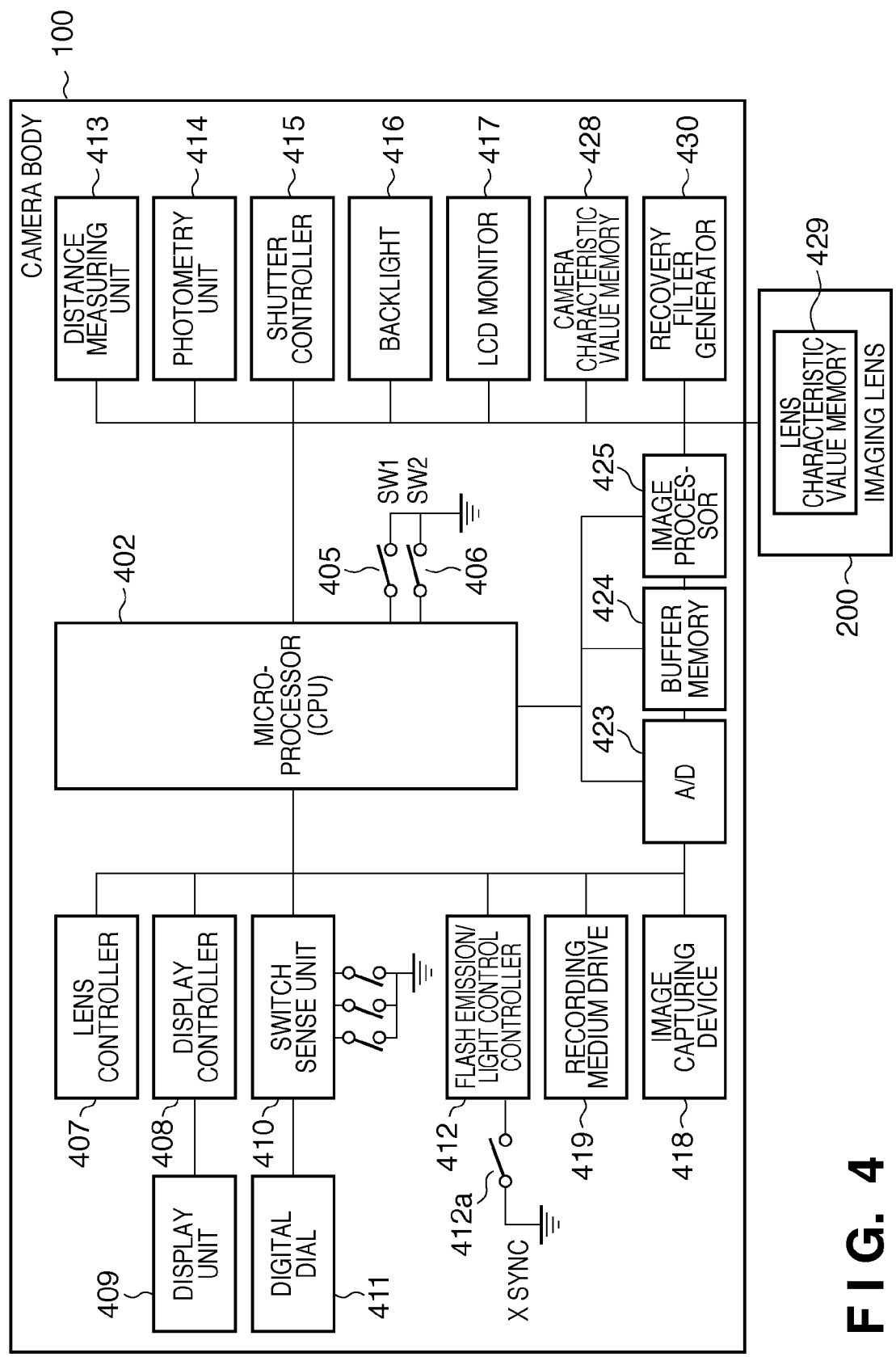
FIG. 4 is a block diagram showing an arrangement associated with control, image capturing, and image processes of the digital camera.

FIG. 4 is a block diagram showing an arrangement associated with control, image capturing, and image processes of the digital camera.

A microcomputer (CPU) 402 controls the operations of the overall camera, such as processing of image data output from the image capturing device 418 and display control of the LCD monitor 417.

A switch (SW1) 405 is turned on at a half stroke position of the release button 112 (halfway pressing state). When the switch (SW1) 405 is turned on, the camera is ready to capture an image. A switch (SW2) 406 is turned on at a full stroke position of the release button 112 (full pressing state). When the switch (SW2) 406 is turned on, the camera body 100 starts an image capturing operation.

A lens controller 407 communicates with the imaging lens 200 and executes drive control of the imaging lens 200 and that of an aperture in an AF mode. A display controller 408 controls the display unit 409 and a display unit (not shown)

inside the viewfinder. A switch sense unit 410 is an interface used to transmit signals output from a large number of switches and keys including the aforementioned digital dial 411 to the CPU 402.

A flash controller 412 is grounded through an X sync 412a, and executes emission control and light control of an external flash. To a recording medium drive 419, the recording medium 419a, such as a hard disk or memory card, is attached.

A distance measuring unit 413 detects a defocus amount with respect to a subject to attain AF control. A photometry unit 414 measures the luminance of a subject, and controls an exposure time. A shutter controller 415 controls the mechanical shutter so as to appropriately expose the image capturing device 418. The LCD monitor 417 and backlight 416 form a display device, as described above.

An image processor 425 includes a digital signal processor (DSP) and the like. Furthermore, to the CPU 402, an analog-to-digital converter (A/D) 423, a buffer memory 424 used to buffer image data, and the like are connected.

A camera characteristic value memory 428 is a nonvolatile memory, which stores various characteristics of the camera body 100. A lens characteristic value memory 429 is a nonvolatile memory that is included in a body of the imaging lens 200, and stores various characteristics of the imaging lens 200.

A recovery filter generator 430 receives lens characteristic values corresponding to the device settings at the time of image capturing from the lens characteristic value memory 429 when the switch (SW2) 406 is turned on to set an image-capturing state, as will be described in detail later. Furthermore, the recovery filter generator 430 reads out camera characteristic values corresponding to the device settings at the time of image capturing from the camera characteristic value memory 428, and generates a recovery filter as a correction filter used to correct a degraded capturing image.

[Image Process]
Arrangement of Recovery Process

Figure 5:
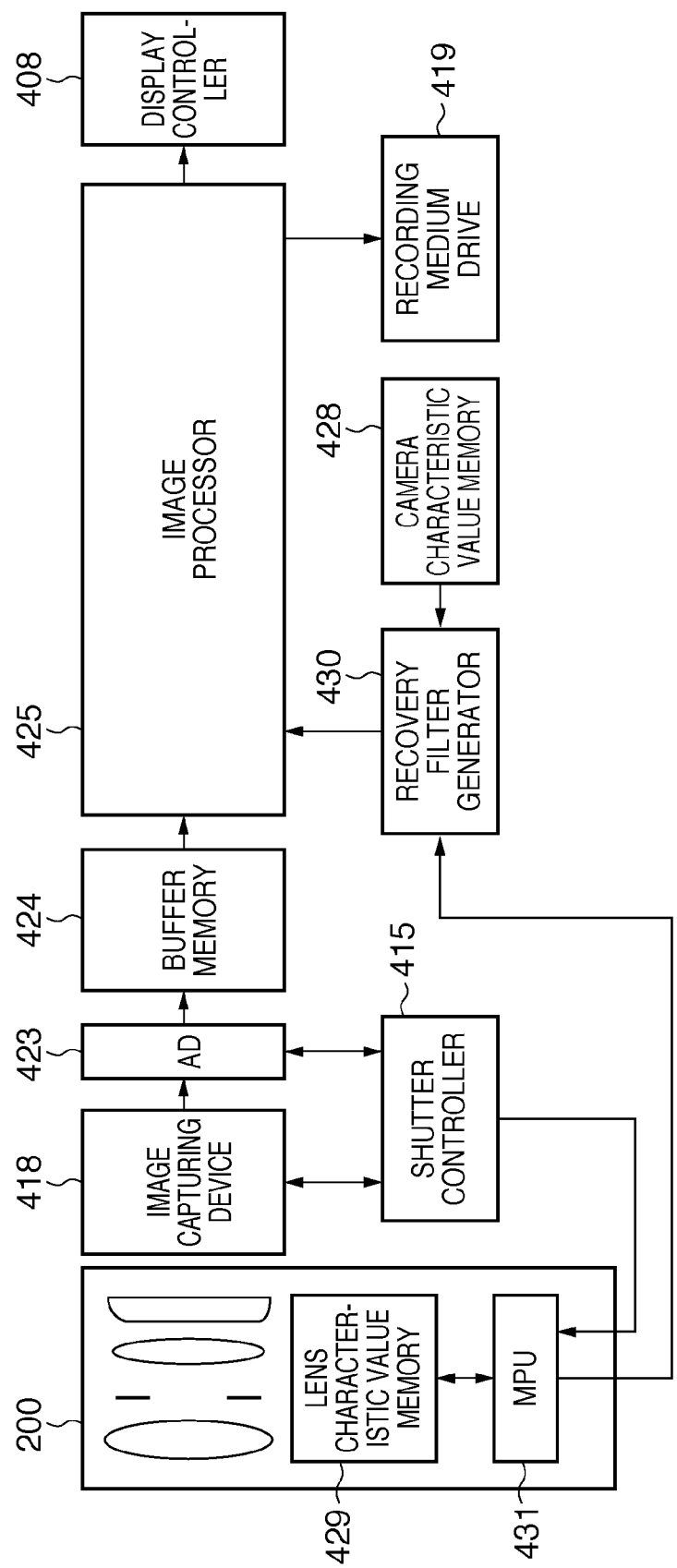
FIG. 5 is a block diagram for explaining an arrangement for executing a recovery process.

FIG. 5 is a block diagram for explaining an arrangement for executing a recovery process.

When an image-capturing state is set, the shutter controller 415 transmits, as lens-setting information, an F-value, a distance to a subject (imaging distance), and a zoom position acquired from the lens controller 407 and the like to a microcontroller (MPU) 431 of the imaging lens 200. The MPU 431 reads out OTF data as optical transfer information of the imaging lens 200 corresponding to the received lens-setting information from the lens characteristic value memory 429, and transmits the OTF data to the recovery filter generator 430.

The recovery filter generator 430 reads out device characteristics of the camera body 100 from the camera characteristic value memory 428. The device characteristics include a sensor pitch, optical low-pass filter (LPF) information, spectral transmittance characteristics of RGB filters, and the like of the image capturing device 418.

The recovery filter generator 430 generates coefficients of recovery filters based on the received OTF data and the readout device characteristics, and transmits the coefficients of the recovery filters to the image processor 425.

Figure 6:
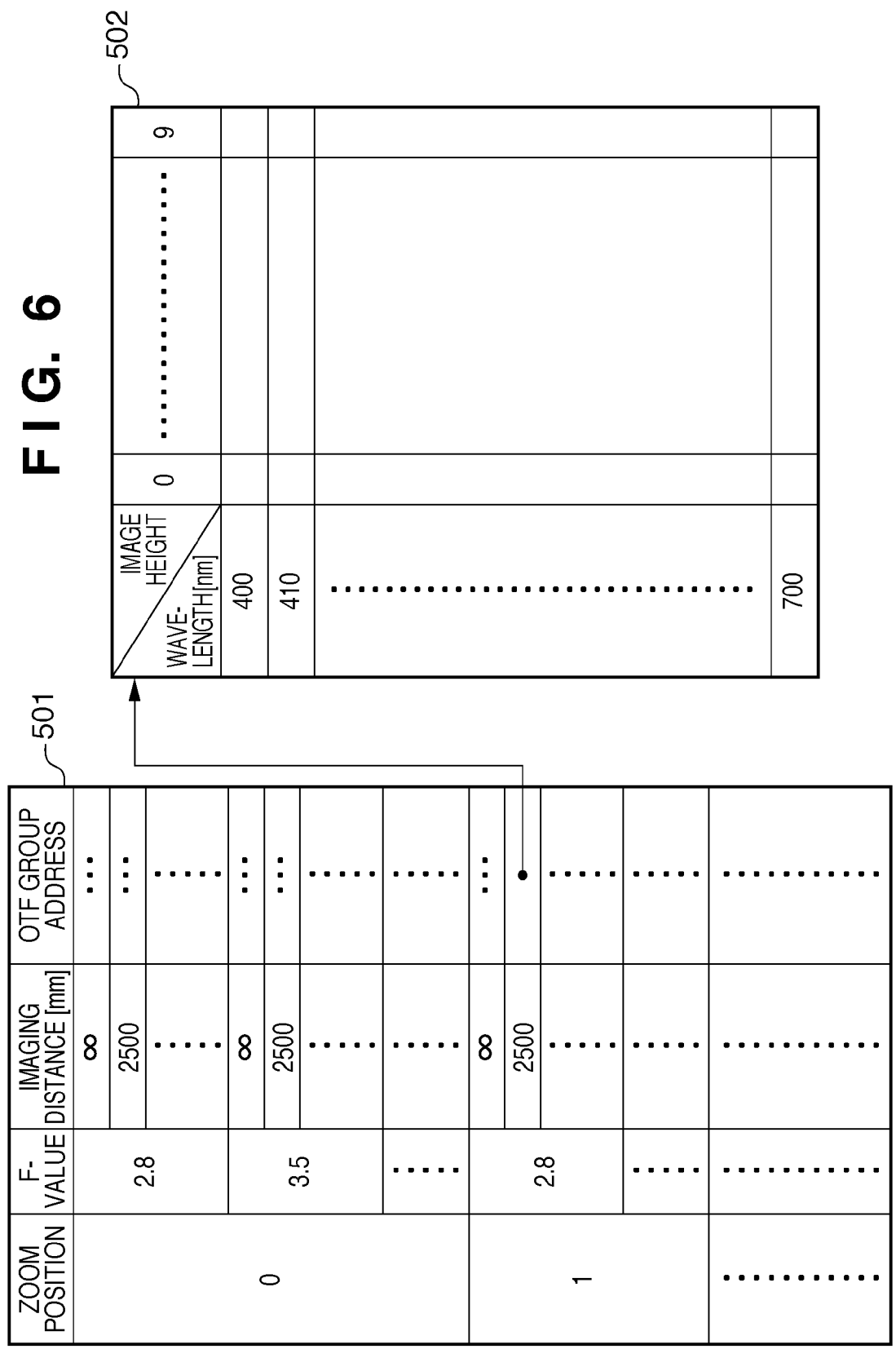
FIG. 6 is a view showing the concept of a data structure held by a lens characteristic value memory.

FIG. 6 is a view showing the concept of a data structure held by the lens characteristic value memory 429.

The lens characteristic value memory 429 has a pointer table 501, which describes pointers indicating addresses of OTF tables that store OTF groups according to lens-setting information. Note that as for a zoom position, for example, a zoom range is divided into ten positions, and indices ranging from 0 to 9 are assigned to these positions from the wide-angle end to the telephoto end. Also, as for an imaging distance, a range from the shortest imaging distance to infinity is divided into ten positions.

Therefore, the number of pointers described in the pointer table 501 amounts to the number of F-values×$10^2$.

An OTF table 502 holds an OTF group corresponding to a zoom position "1", F-value=2.8, and imaging distance=2500 mm. The OTF group is a set of 310 (=10×31) OTF data obtained by dividing an image height into ten positions (indices 0 to 9), and also dividing a wavelength range from 400 nm to 700 nm to have a step size of 10 nm. In other words, the number of OTF data used in generation of one recovery filter is 310. That is, the OTF data transmitted by the MPU 431 are a set of OTF data corresponding to all image heights and respective wavelengths according to the lens-setting information.

Figure 7:
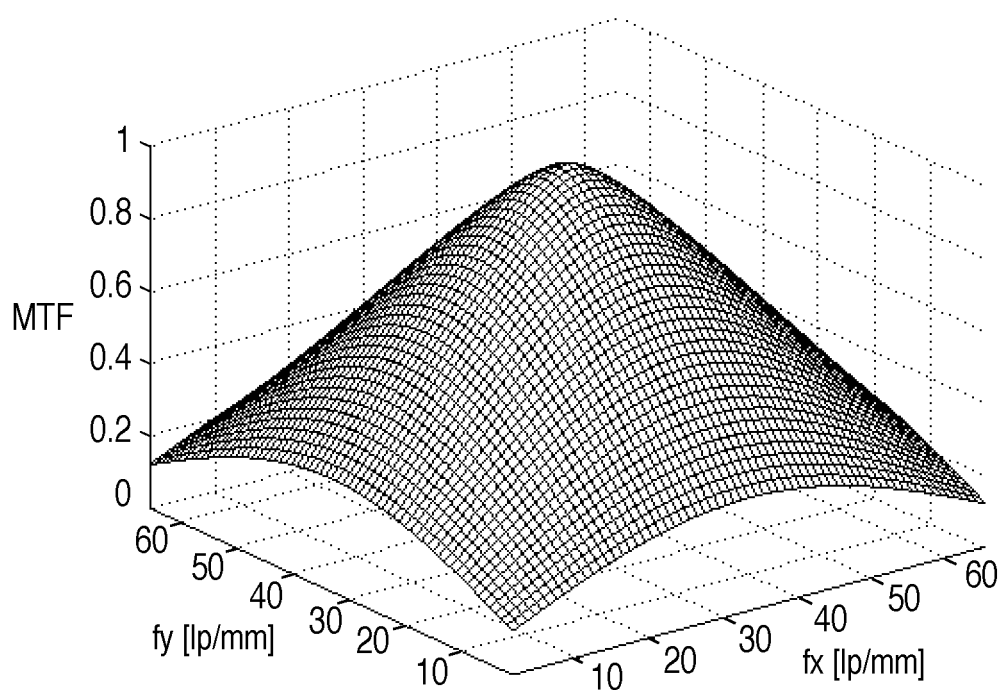
FIG. 7 is a graph showing an example of an OTF of an image height "l" at a certain wavelength.

FIG. 7 is a graph showing an example of an OTF of an image height "I" at a certain wavelength. Note that since the OTF is a complex number, FIG. 7 shows an MTF as the absolute value of the OTF. In FIG. 7, the spatial frequency in the horizontal direction (x-direction) in an image is represented by fx, that in the vertical direction (y-direction) is represented by fy, and a unit of the spatial frequency is indicated by line pairs per mm (lp/mm or line pairs/mm). Line pairs serve as an index of a resolution, and represent how many pairs of black and white lines each having an equal width are included per mm.

Note that when the imaging conditions are sorted out in more detail, OTF data more suitable for the imaging conditions can be obtained, and an optimal recovery filter to the imaging conditions can be generated. However, when the imaging conditions are sorted out in more detail, the OTF data amount increases accordingly, and the memory size of the lens characteristic value memory 429 has to be increased.

Recovery Process

FIG. 8 is a flowchart for explaining the recovery process.

Upon reception of a notification indicating the switch (SW2) 406=ON from the CPU 402, that is, when an image-capturing state is set (S701), the shutter controller 415 acquires lens-setting information from the lens controller 407 (S702). Then, the shutter controller 415 transmits the acquired lens-setting information to the imaging lens 200 (S703).

Upon reception of the lens-setting information (S704), the MPU 431 of the imaging lens 200 reads out OTF data corresponding to the lens-setting information from the lens characteristic value memory 429 (S705), and transmits the readout OTF data to the camera body 100 (S706).

The recovery filter generator 430 of the camera body 100 receives the OTF data (S707), and reads out device characteristics of the camera body 100 from the camera characteristic value memory 428 (S708). Then, as will be described in detail later, the recovery filter generator 430 generates coefficients of recovery filters based on the received OTF data and the readout device characteristics (S709), and transmits the coefficients of the recovery filters to the image processor 425 (S710).

The image processor 425 applies a developing process such as demosaicing to capturing data read out from the buffer memory 424 (S711). Note that the capturing data is data before demosaicing (developing process) (to be also referred to as RAW data hereinafter) obtained by converting a signal output from the image capturing device 418 as an image capturing unit into digital data by the A/D 423. Also, note that at least the image capturing device 418 forms an image capturing unit, but a combination of the image capturing device 418 and A/D 423 may often be called an image capturing unit. Alternatively, the camera body 100 may often be called an image capturing unit.

The image processor 425 corrects a degraded image by applying a recovery-filter process to the image data that has undergone the developing process using the received coefficients of the recovery filters (S712). Then, the image processor 425 outputs the image data after the recovery-filter process to the display controller 408 or recording medium drive 419 (S713).

Generation of Recovery Filter

Figure 9:
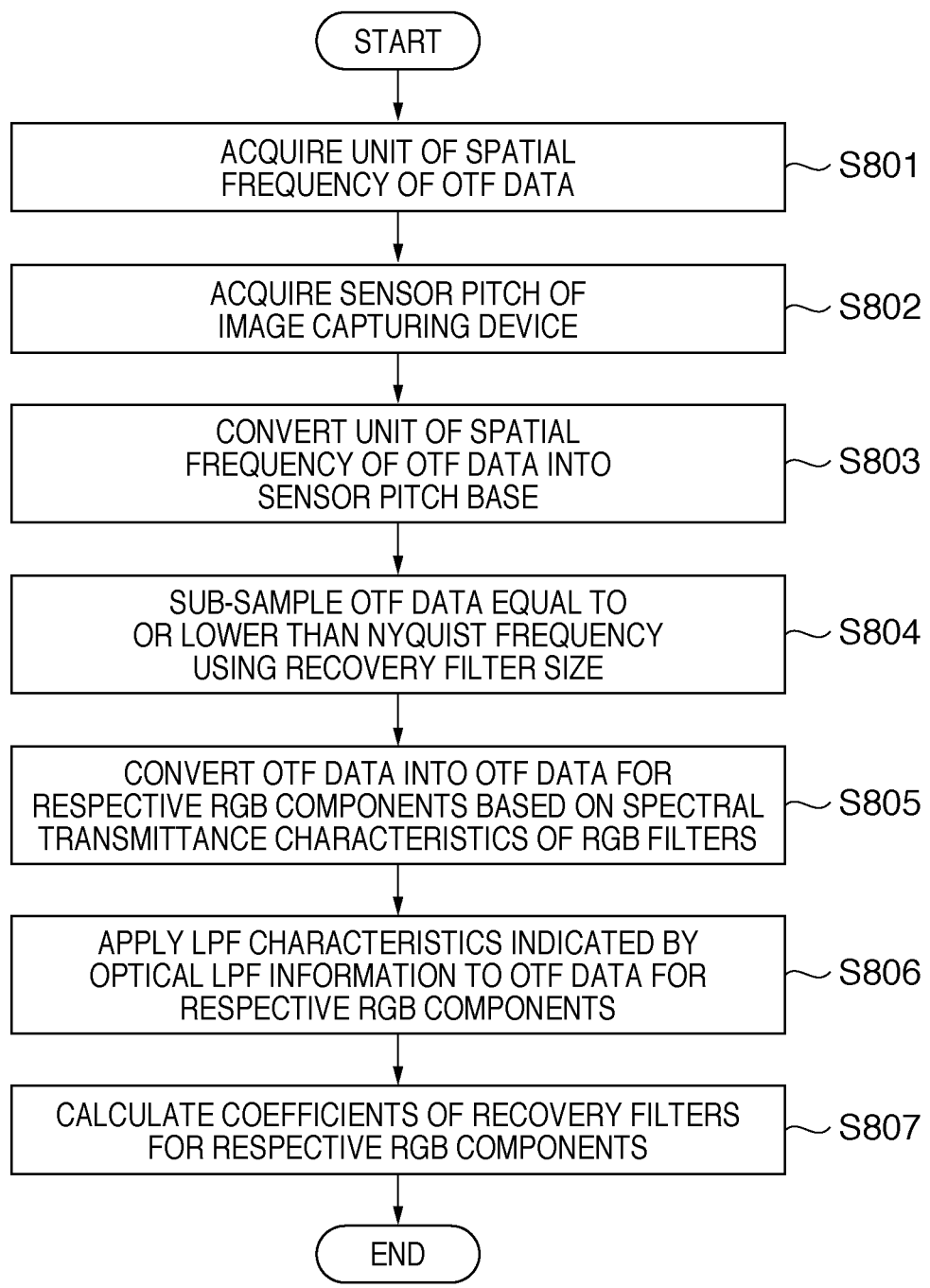
FIG. 9 is a flowchart for explaining the process for generating coefficients of a recovery filter.

FIG. 9 is a flowchart for explaining the process (S709) for generating the coefficients of the recovery filters.

The recovery filter generator 430 acquires a unit of the spatial frequency of OTF data (S801). Note that the unit of the spatial frequency in this embodiment is lp/mm.

The recovery filter generator 430 then acquires a sensor pitch of the image capturing device 418 from the device characteristics (S802). Assume that the sensor pitch is 5.0 μm in this embodiment.

The recovery filter generator 430 converts the unit of the spatial frequency of the OTF data into a unit lp/pixel of the sensor pitch base (pixel pitch base) (S803) using the sensor pitch by:

$$fx[lp/pixel]=fx[lp/mm]\times 5.0\ [\mu m]$$

$$fy[lp/pixel]=fy[lp/mm]\times 5.0\ [\mu m] \quad (6)$$

By converting the unit of the spatial frequency into lp/pixel, the Nyquist frequency is unconditionally expressed by 0.5 lp/pixel, and the sampling frequency is expressed by 1.0 lp/pixel. When the sensor pitch is 5.0 μm, the Nyquist frequency is 100 lp/mm. If the sensor pitch is 2.0 μm, the Nyquist frequency is 250 lp/mm.

The recovery filter generator 430 sub-samples OTF data equal to or lower than the Nyquist frequency of those converted into a sensor pitch-based frequency space using the recovery filter size to be finally generated (S804).

Figure 10A:
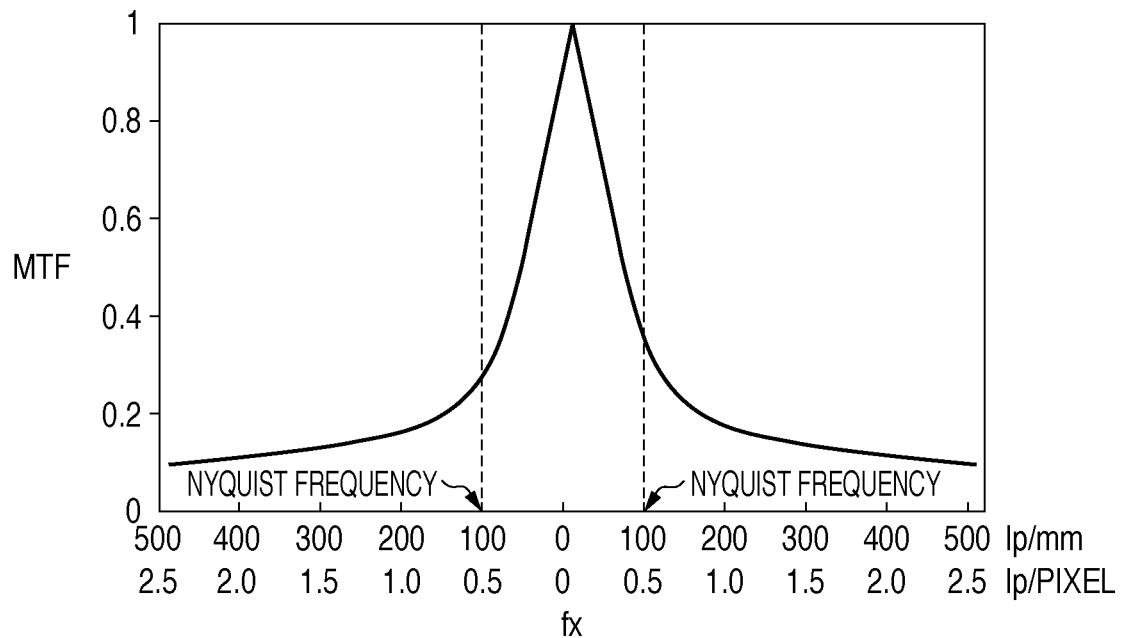
FIGS. 10A and 10B are graphs illustrating sub-sampling.
Figure 10B:
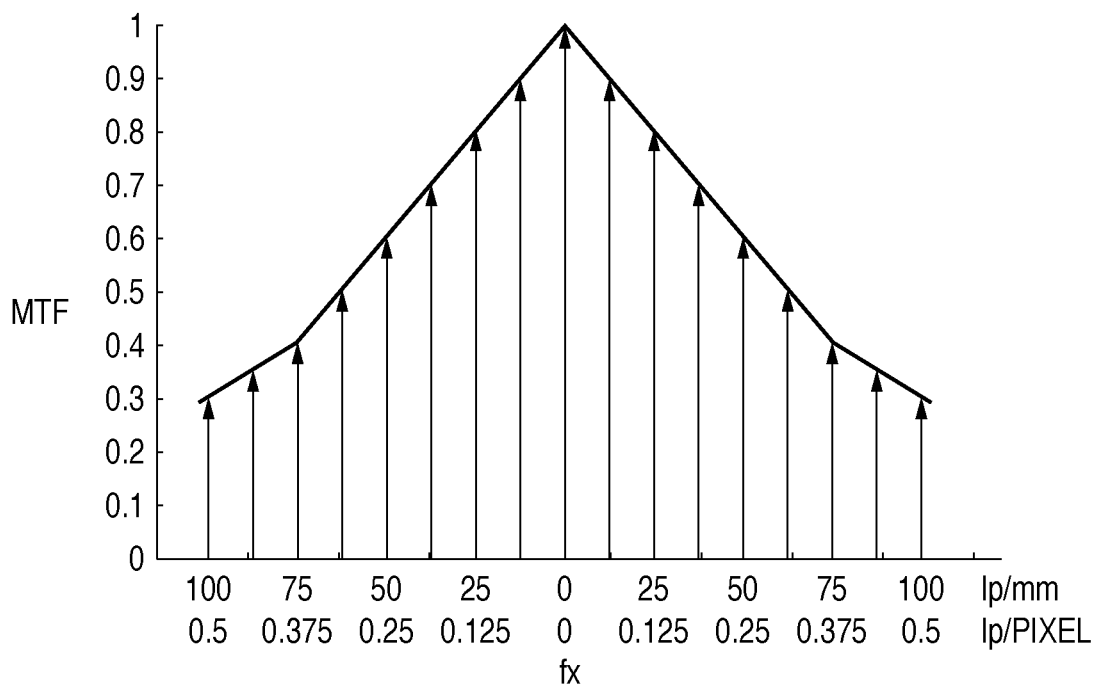

FIGS. 10A and 10B are graphs illustrating sub-sampling. FIG. 10A is a graph showing the distribution of MTFs (the absolute values of OTFs) in the frequency fx direction at a frequency fy=0 of OTF data at a certain wavelength. As described above, when the sensor pitch is 5 μm, the Nyquist frequency is 100 lp/mm (0.5 lp/pixel), and MTFs within a region sandwiched between the broken lines shown in FIG. 10A are extracted. FIG. 10B is a graph showing the distribution of MTFs equal to or lower than the Nyquist frequency. Assuming that the MTFs are distributed up to 500 lp/mm, as shown in FIG. 10A, when MTFs equal to or lower than 100 lp/mm are extracted, the data amount is reduced to 1/25, and the subsequent calculation amount can be greatly reduced, as described by:

$$(100+100)^2/(500+500)^2=1/25 \quad (7)$$

The recovery filter generator 430 sub-samples the extracted OTF data in correspondence with the recovery filter size. For example, assuming that the recovery filter size is 17×17, the recovery filter generator 430 samples OTF data every 0.0625 lp/pixel, as indicated by arrows ↑ in FIG. 10B.

In this way, upon completion of step S804, 17×17 OTF data corresponding to wavelengths=400, 410, 420, 690, and 700 nm can be obtained. Note that the recovery filter size may be a predetermined fixed value or may be decided by user's designation or depending on other parameters (the number of pixels, ISO speed, etc.) set at the time of image capturing.

The recovery filter generator 430 acquires the spectral transmittance characteristics of RGB filters from the device characteristics, and multiplies the 17×17 wavelength-dependent OTF data by the acquired characteristics, thereby converting them into OTF data for respective RGB components (S805).

FIG. 11 is a graph showing an example of the spectral transmittance characteristics of the RGB filters. As shown in FIG. 11, OTF data of respective wavelengths are multiplied by the transmittances of the corresponding wavelengths of the filters of respective components to normalize the OTF data by the sum totals of these products, thereby obtaining OTF data for respective RGB components.

The recovery filter generator 430 acquires the optical LPF information from the device characteristics, and applies low-pass filter characteristics indicated by the optical LPF information to the OTF data for respective RGB components (S806). In this manner, OTF data for respective RGB components upon combination of the imaging lens 200 and camera body 100 are calculated.

The recovery filter generator 430 calculates the coefficients of recovery filters for respective RGB components using the OTF data obtained in step S806 (S807). Note that since the recovery-filter generation method has been described above, a detailed description thereof will not be repeated. In this way, three filters each including 17×17 real values are generated as the recovery filters of a real space.

Figure 12:
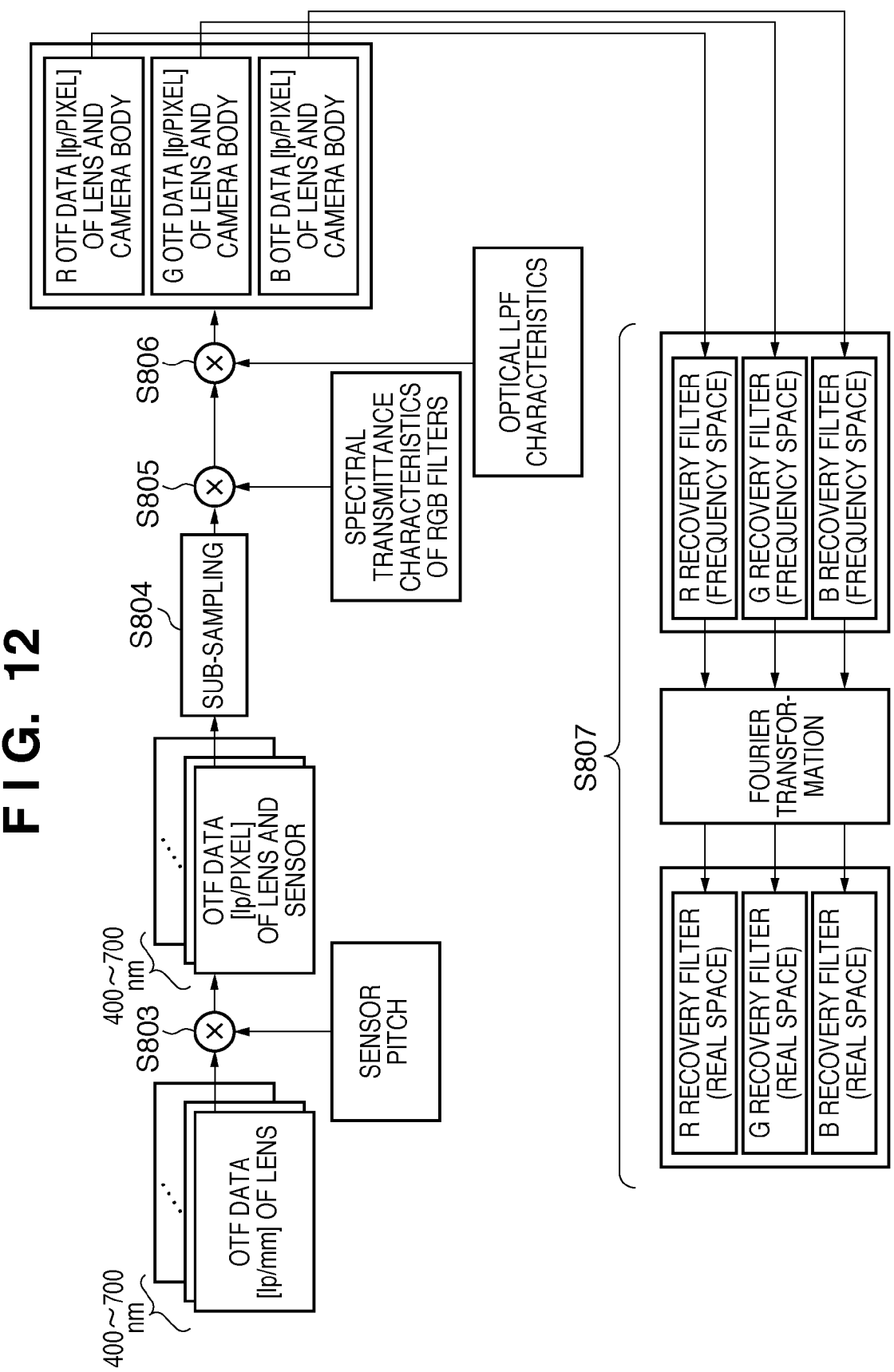
FIG. 12 is a chart illustrating generation of recovery filters.

FIG. 12 is a chart illustrating the generation of the recovery filters, and shows the data flow until the recovery filters of the real space for respective RGB components are generated from OTF data. As described above, OTF data for respective frequencies, which are independent from the image capturing device, are prepared for the imaging lens 200. Then, the camera body 100 side converts the OTF data acquired from the imaging lens 200 based on the sensor pitch, the spectral transmittance characteristics of the RGB filters, and the optical LPF characteristics of the image capturing device 418.

In this way, the camera body side can generate OTF data corresponding to each combination of the imaging lens and camera body. That is, an imaging lens, which holds OTF data, and a camera body, which holds the device characteristics of the image capturing device, allow the generation of OTF data corresponding to a specific combination of an imaging lens as a new model and an existing camera body (or vice versa), and recovery filters can be generated.

Of course, since the imaging lens holds OTF data, and the camera body holds the device characteristics of the image capturing device, they can be independently developed. Also, since the imaging lens and camera body need only hold their own information, the data amount to be held to generate recovery filters can be suppressed in both the imaging lens and the camera body. Furthermore, when an imaging lens or camera body as a new model is used, the need for troublesome operations, such as updating of firmware, can be obviated for the user.

Second Embodiment

An image process according to the second embodiment of the present invention will be described below. Note that the same reference numerals in the second embodiment denote the same components as in the first embodiment, and a detailed description thereof will not be repeated.

As described above, in order to cope with the sensor pitch=5 μm, data of spatial frequencies up to data of the Nyquist frequency=100 lp/mm need only be included. When a finer sensor pitch is set, data of spatial frequencies up to 250 lp/mm have to be included for 2.0 μm, and those up to 500 lp/mm have to be included for 1 μm.

Furthermore, the OTF data are complex numbers, and are two-dimensional data defined by the frequency space in the vertical and horizontal directions. Therefore, even only OTF data corresponding to certain device characteristic information require a very large data amount. Hence, the data amount of OTF data to be transmitted from the imaging lens 200 to the camera body 100, in other words, the data communication amount between the imaging lens 200 and camera body 100 becomes still very large.

Thus, the second embodiment will explain an arrangement in which an MPU 431 of an imaging lens 200 calculates the coefficients of recovery filters, and transmits the calculated coefficients to an image processor 425. Note that the MPU 431, such as a one-chip microcontroller, executes data processes to be described later according to programs stored in its internal read-only memory (ROM) using its internal random access memory (RAM) as a work memory.

Figure 13:
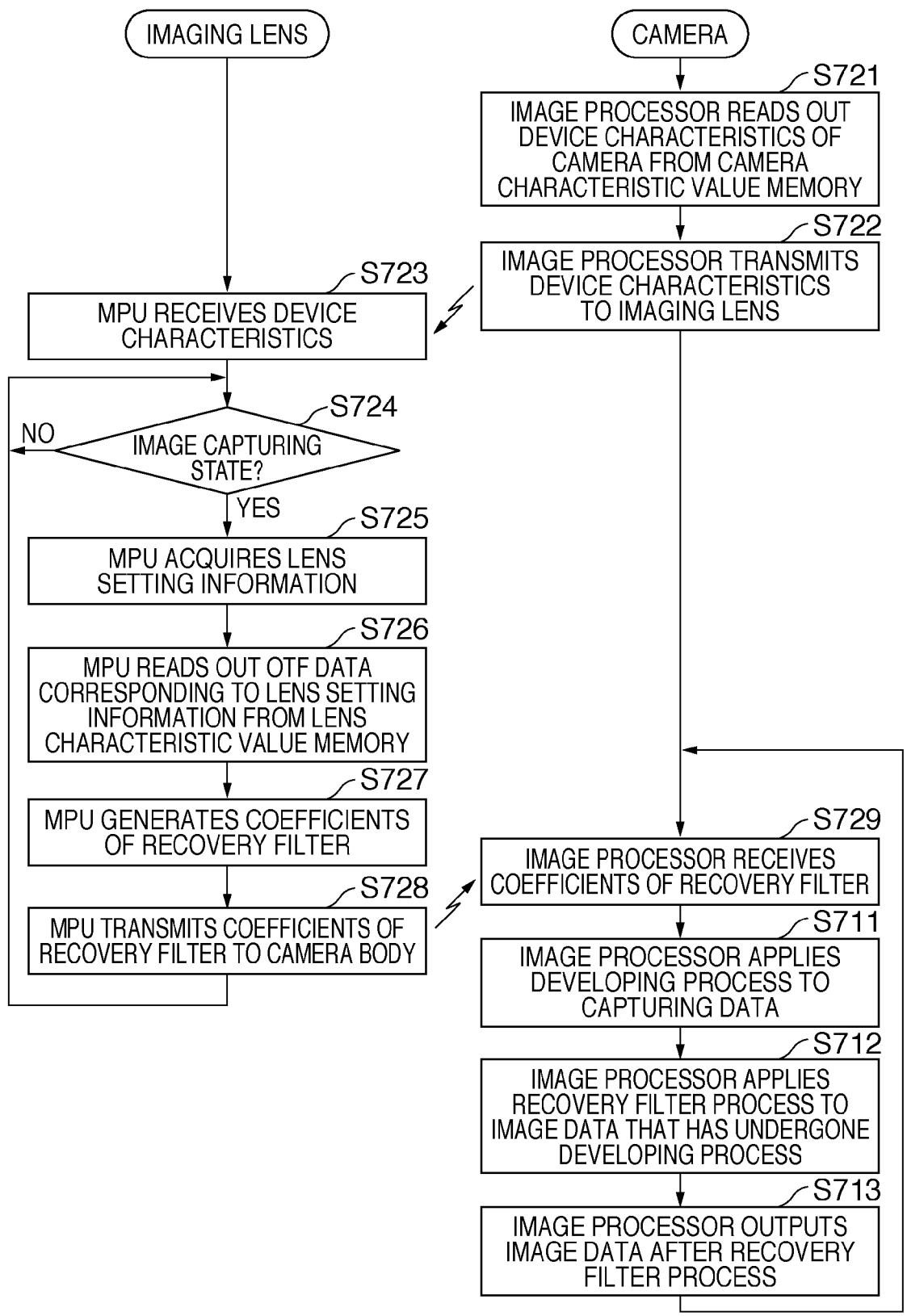
FIG. 13 is a flowchart for explaining a recovery process according to the second embodiment.

FIG. 13 is a flowchart for explaining a recovery process according to the second embodiment. Note that the same step numbers in FIG. 13 denote the same processes as in FIG. 8, and a detailed description thereof will not be repeated.

The image processor 425 reads out device characteristics of a camera body 100 from a camera characteristic value memory 428 (S721). Then, the image processor 425 transmits the device characteristics to the imaging lens 200 (S722). The MPU 431 of the imaging lens 200 receives the device characteristics (S723). Note that since the device characteristics do not depend on the imaging conditions, the processes in steps S721 to S723 need only be executed once at the time of execution of an initialization process upon power ON after the imaging lens 200 and the camera body 100 are connected.

Upon reception of a notification of an image-capturing state from a shutter controller 415 (S724), the MPU 431 acquires lens-setting information from a lens controller 407 (S725), and reads out OTF data corresponding to the lens-setting information from a lens characteristic value memory 429 (S726). Then, the MPU 431 generates the coefficients of recovery filters by executing the same processing sequence as in FIG. 9 based on the received device characteristics and the readout OTF data (S727), and transmits the coefficients of the recovery filters to the camera body 100 (S728).

The image processor 425 of the camera body 100 receives the coefficients of the recovery filters (S729). Then, the image processor 425 executes a developing process (S711), a recovery-filter process (S712), and an output process (S713) in the same manner as in the processing sequence shown in FIG. 8.

According to this arrangement, data to be transmitted from the imaging lens 200 to the camera body 100 are, for example, sets of real value data of three 17×17 recovery filters for each image height, and the data communication amount can be greatly reduced compared to transmission of a set of OTF data.

In general, the MPU 431 included in the imaging lens 200 has an arithmetic power inferior to the CPU 402 included in the camera body 100. For this reason, when the imaging lens 200 generates recovery filters, an arithmetic process of the recovery filters requires more time than the case in which the camera body 100 generates recovery filters. However, the data communication amount between the imaging lens 200 and camera body 100 can be greatly reduced.

In the example of the above description, all the device characteristics are transmitted to the imaging lens 200, and the imaging lens 200 generates the coefficients of the recovery filters. However, a method of transmitting only the sensor pitch to the imaging lens 200 is available. Then, a recovery filter generator 430 receives OTF data whose data amount is reduced after sub-sampling, and executes subsequent processes (application of the spectral transmittance characteristics of RGB filters and optical LPF characteristics, and Fourier transformation). In this manner, although the data communication amount is reduced less than the processing sequence shown in FIG. 13, the arithmetic process load on the MPU 431 can be reduced.

Likewise, a method of transmitting the sensor pitch and the spectral transmittance characteristics of RGB filters to the imaging lens 200 is also available. Then, the recovery filter generator 430 receives, for example, the frequency characteristics data of the three 17×17 recovery filters for each image height, and executes the subsequent processes (application of the optical LPF characteristics, and Fourier transformation). In this way, the data communication amount can be reduced as in the processing sequence shown in FIG. 13, and the arithmetic process load on the MPU 431 can be reduced.

In particular, since the Fourier transformation requires a heaviest arithmetic process load, when at least the Fourier transformation is excluded from the processes of the MPU 431, the arithmetic process load on the MPU 431 can be significantly reduced.

Third Embodiment

An image process according to the third embodiment of the present invention will be described below. Note that the same reference numerals in the third embodiment denote the same components as in the first and second embodiments, and a detailed description thereof will not be repeated.

The first embodiment has exemplified the case in which a recovery process is executed by generating recovery filters in the camera body 100. The second embodiment has exemplified the case in which a recovery process is executed by generating recovery filters in the imaging lens 200. However, in general, the CPU 402 included in the camera body 100 and the MPU 431 included in the imaging lens 200 are powerless, and require much time to generate the recovery filters.

The third embodiment will exemplify a case in which information required to generate recovery filters and capturing data are saved in a file, and software which runs on an external computer generates the recovery filters and executes a recovery process.

Figure 14:
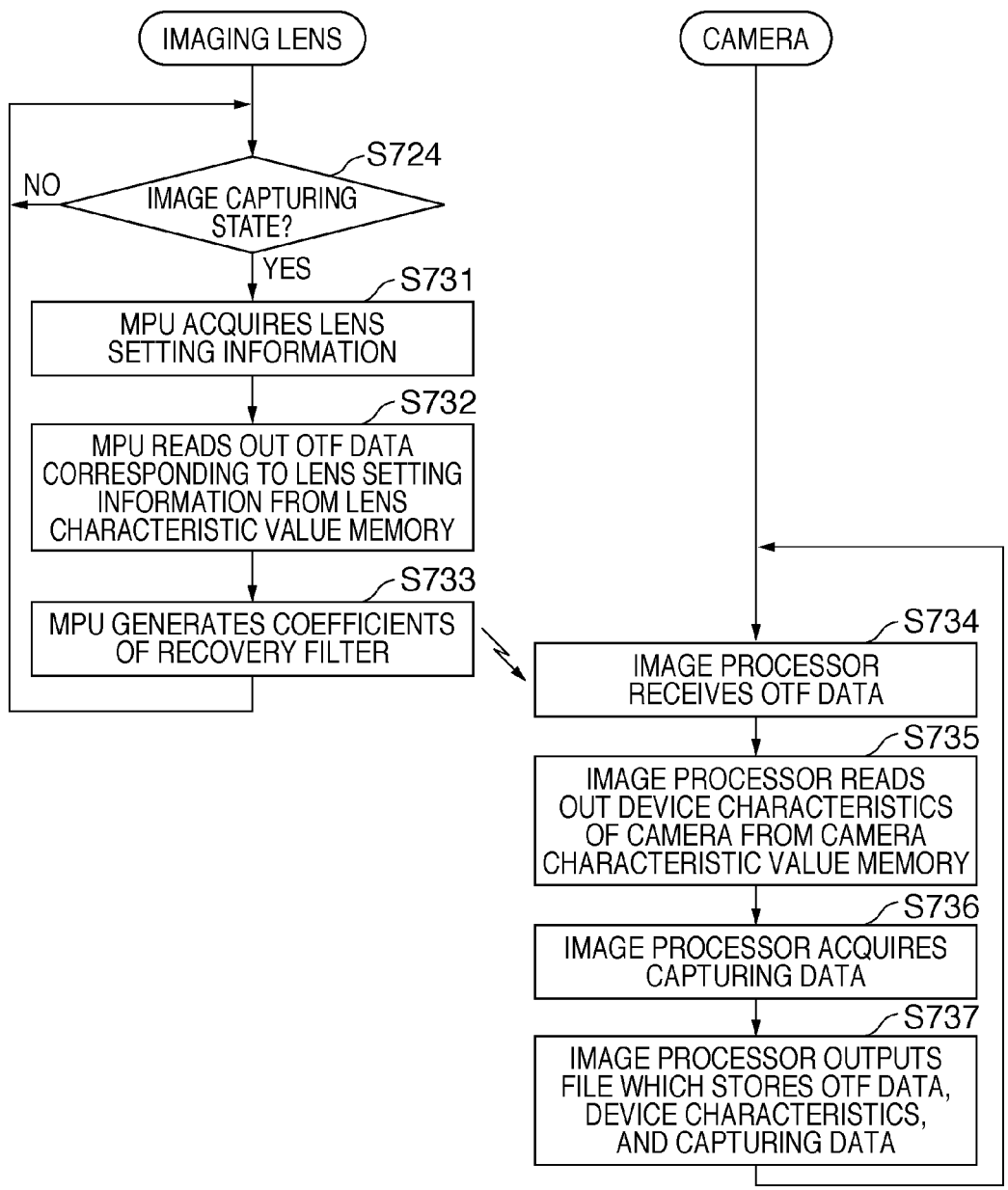
FIG. 14 is a flowchart for explaining the processing sequence according to the third embodiment.

FIG. 14 is a flowchart for explaining the processing sequence according to the third embodiment.

Upon reception of a notification of an image-capturing state from a shutter controller 415 (S724), an MPU 431 acquires lens-setting information from a lens controller 407 (S731), and reads out OTF data corresponding to the lens-setting information from a lens characteristic value memory 429 (S732). Then, the MPU 431 transmits the readout OTF data to a camera body 100 (S733).

An image processor 425 of the camera body 100 receives the OTF data (S734), reads out device characteristics of the camera body 100 from a camera characteristic value memory 428 (S735), and acquires capturing data from the buffer memory 424 (S736). Then, the image processor 425 saves the OTF data, device characteristics, and capturing data in a file, and outputs the file to a recording medium drive 419 (S737).

A file of a RAW data format stored in the recording medium 419a normally saves lens-setting information as information at the time of image capturing together with capturing data. Therefore, in a file to be output in this embodiment, new areas for saving the device characteristic values of the camera body 100 and OTF data are added to existing areas for saving RAW data and lens-setting information.

The recovery-filter-generation process and the recovery process by the software which runs on the external computer are the same as those in the aforementioned methods.

In the example of the above description, the OTF data received from the imaging lens 200, and the sensor pitch, the spectral transmittance characteristics of RGB filters, and the optical LPF characteristics as the device characteristics of the camera body 100 are saved in a file. Alternatively, OTF data whose data amount is reduced after sub-sampling, the spectral transmittance characteristics of RGB filters, and the optical LPF characteristics may be saved in a file. In this manner, the data size of a file to be stored in the recording medium 419a can be reduced.

[Modification]

The first and second embodiments have exemplified the case in which recovery filters are generated, and a recovered image that has undergone a recovery process is stored as a file in the recording medium 419a. The third embodiment has exemplified the case in which a file which saves information required to generate recovery filters together with capturing data is stored in the recording medium 419a.

When an imaging mode set in the camera body 100 is the JPEG mode, the recovery process is executed based on the processing sequence of the first or second embodiment, and a recovered image that has undergone the recovery process is stored as a file in the recording medium 419a. On the other hand, when the imaging mode is the RAW mode, capturing data and information required to generate recovery filters may be saved in a file based on the processing sequence of the third embodiment.

Fourth Embodiment

An image process according to the fourth embodiment of the present invention will be described below. Note that the same reference numerals in the fourth embodiment denote the same components as in the first to third embodiments, and a detailed description thereof will not be repeated.

The fourth embodiment will exemplify a case in which a process of a level according to an imaging mode is executed. That is, when the imaging mode set in a camera body 100 is the JPEG mode, the recovery process is executed using a common recovery filter which is independent from lens-setting information at the time of image capturing, and a recovered image is saved in a file in a JPEG format. When the imaging mode is the RAW mode, recovery filters which are generated according to the lens-setting information at the time of image capturing are saved in a file together with capturing data.

Figure 15:
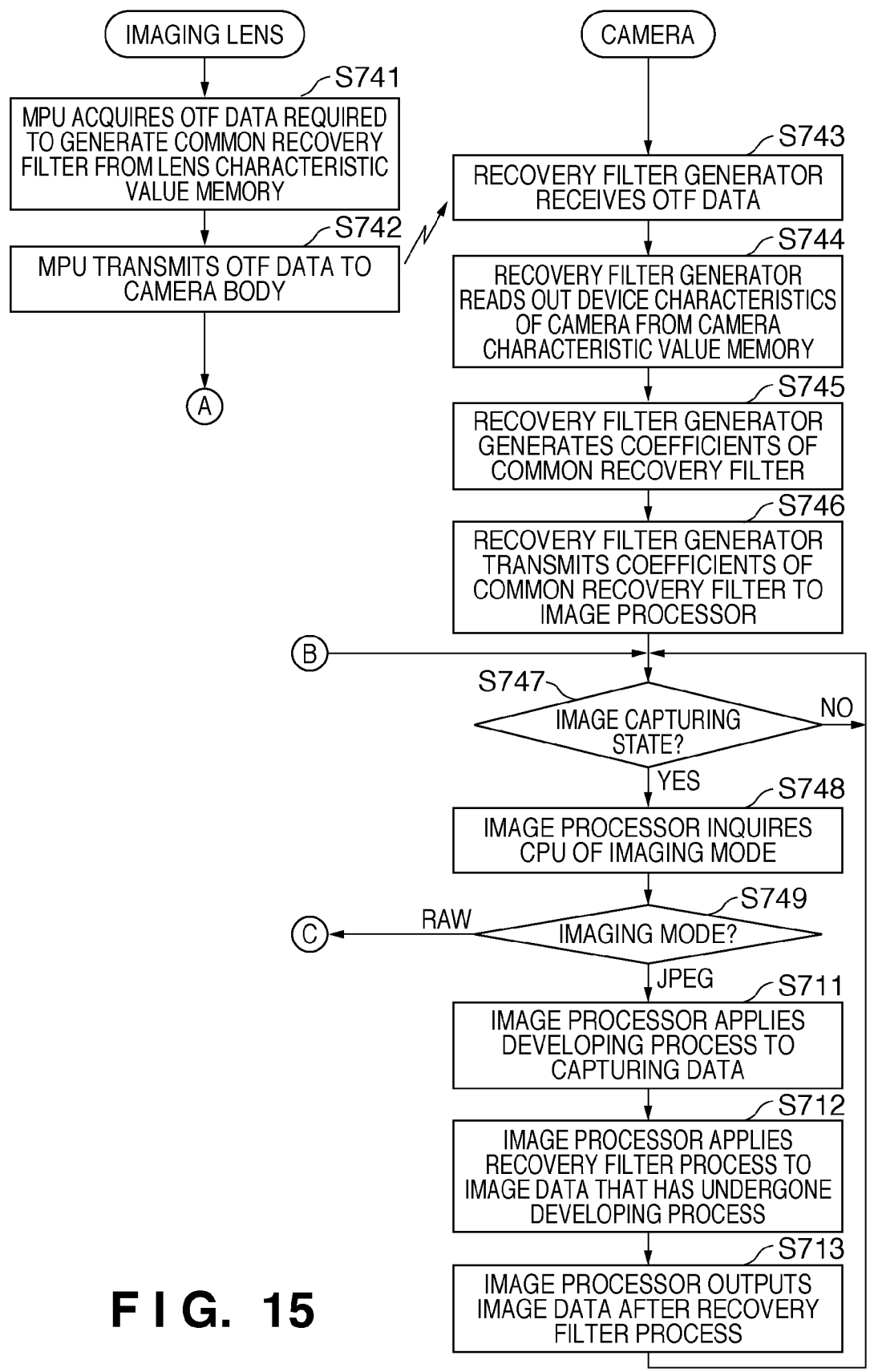
FIGS. 15 and 16 are flowcharts for explaining the processing sequence according to the fourth embodiment.
Figure 16:
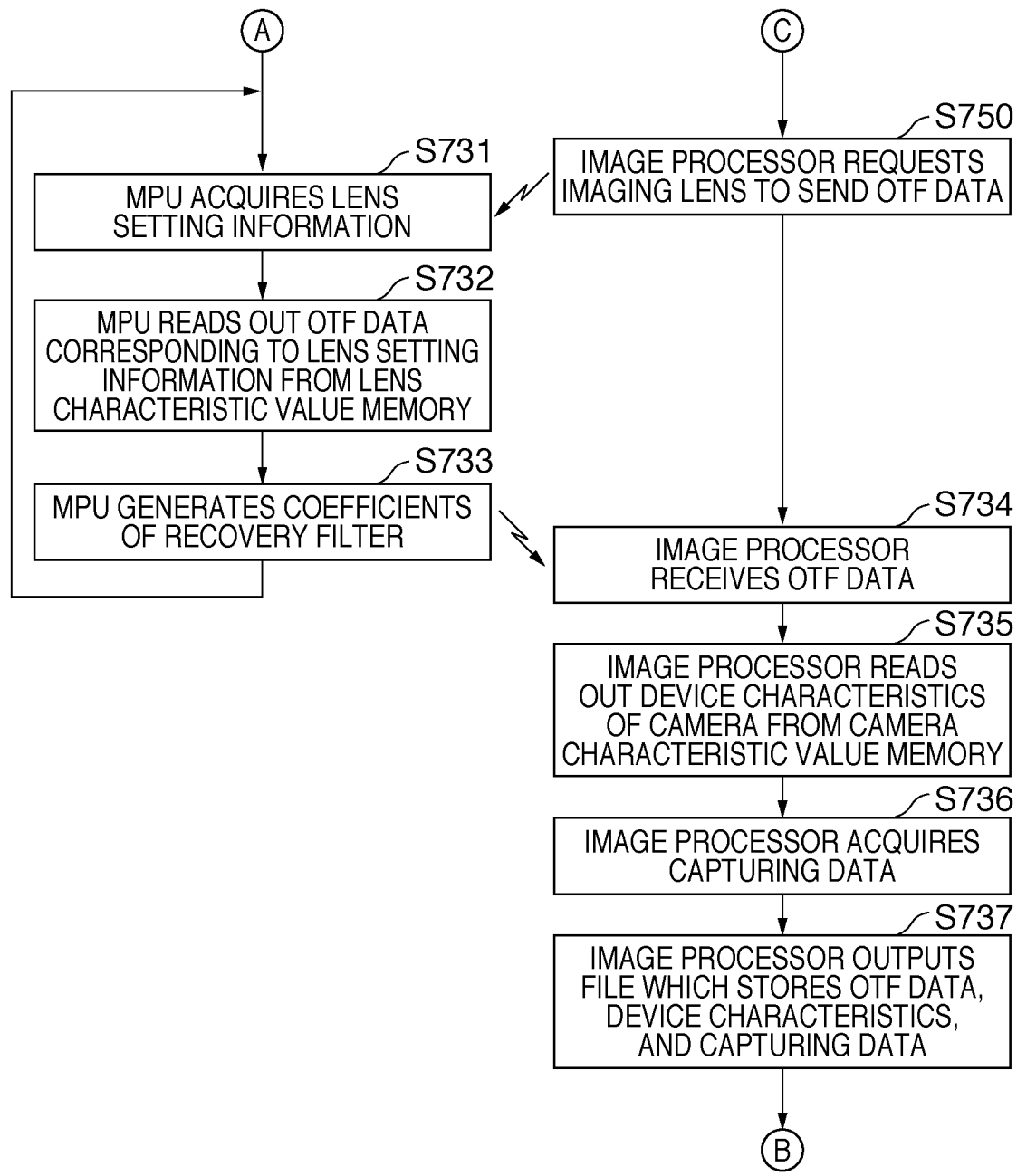

FIGS. 15 and 16 are flowcharts for explaining the processing sequence according to the fourth embodiment. Note that the same step numbers in FIGS. 15 and 16 denote the same processes as in FIGS. 8 and 14, and a detailed description thereof will not be repeated.

An MPU 431 of an imaging lens 200 acquires OTF data required to generate a common recovery filter from a lens characteristic value memory 429 (S741), and transmits the acquired OTF data to the camera body 100 (S742).

A recovery filter generator 430 of the camera body 100 receives the OTF data (S743), and acquires device characteristics of the camera body 100 from the camera characteristic value memory 428 (S744). The recovery filter generator 430 calculates coefficients of the common recovery filter from the received OTF data and the acquired device characteristics (S745), and transmits the calculated coefficients to the image processor 425 (S746).

Note that the common recovery filter remains unchanged if the combination of an imaging lens 200 and the camera body 100 is fixed. Therefore, the processes in steps S741 to S746 need only be executed once at the time of execution of an initialization process upon power ON after the imaging lens 200 and the camera body 100 are connected. The common recovery-filter-generation process is the same as that in FIG. 9.

Upon reception of a notification of an image-capturing state from a CPU 402 (S747), the image processor 425 inquires of the CPU 402 of the set imaging mode (S748). The image processor 425 then determines the imaging mode (S749). If the imaging mode is the JPEG mode, the image processor 425 executes a developing process (S711), a recovery-filter process (S712), and an output process (S713) in the same manner as in the processing sequence shown in FIG. 8. Note that the image processor 425 uses the common recovery filter in the recovery-filter process (S712).

On the other hand, if the imaging mode is the RAW mode, the image processor 425 requests the imaging lens 200 to send OTF data (S750). In response to this request, the MPU 431 acquires lens-setting information (S731), reads out OTF data (S732), and transmits the OTF data (S733) in the same manner as in the processing sequence in FIG. 14.

The image processor 425 receives the OTF data (S734), acquires device characteristics (S735), acquires capturing data (S736), and outputs a file that saves the OTF data, device characteristics, and capturing data (S737) in the same manner as in the processing sequence shown in FIG. 14.

In this manner, according to the fourth embodiment, the processes are selectively executed according to the imaging modes. As a result, when the JPEG mode is set, the recovery process is executed using the common recovery filter. In this case, although the recovery precision decreases, the need for the process for generating recovery filters for each image capturing can be obviated, and the arithmetic-process power and arithmetic-process time required for the recovery process can be reduced. On the other hand, when the RAW mode is set, a file that saves the OTF data, device characteristics, and capturing data can be output to allow an external apparatus to execute an optimal recovery process.

Of course, when a JPEG+RAW mode is set as the imaging mode, a file that saves JPEG data processed using the common recovery filter, OTF data, device characteristics, and capturing data can be output.

Fifth Embodiment

An image process according to the fifth embodiment of the present invention will be described below. Note that the same reference numerals in the fifth embodiment denote the same components as in the first to fourth embodiments, and a detailed description thereof will not be repeated.

In the example of FIG. 6 in the first embodiment, the lens characteristic value memory 429 holds 310 OTF data for each combination of parameters (each combination of the zoom position, F-value, and imaging distance), and requires a very large storage capacity.

FIG. 17 is a view showing the concept of a data structure held by a lens characteristic value memory 429 according to the fifth embodiment.

The lens characteristic value memory 429 according to the fifth embodiment has a pointer table 1701 which describes pointers indicating addresses of OTF tables that store OTF groups according to lens-setting information. The pointer table 1701 has OTF group addresses indicating addresses of OTF tables (not shown) in a memory for respective combinations of parameters.

The fifth embodiment is characterized in that identical or nearly identical OTF tables are shared to reduce the memory size of the lens characteristic value memory 429. For example, when an image of a distant landscape is to be captured (when the imaging distance is large), identical OTF data may often be used at that time even when the imaging distance is changed. In the data structure example shown in FIG. 17, in case of a "zoom position '0' and F-value=2.8", a pointer which points to an identical OTF table is stored for distant landscape image capturing processes from ∞ to 1250 mm. On the other hand, pointers which point to different OTF tables for respective combinations of parameters are stored for close view image capturing processes of 625 mm or less.

Also, FIG. 17 shows that an OTF table for a "zoom position '0', F-value=3.5, and imaging distance=400 mm" is the same as that for a "zoom position '1', F-value=2.8, and imaging distance=625 mm".

In order to implement the aforementioned sharing of OTF tables, the following processes are executed.

(1) OTF tables corresponding to all combinations of parameters are generated.

(2) The number of OTF tables that can be stored in the lens characteristic value memory 429 is calculated based on the memory size of the lens characteristic value memory 429.

(3) Representative OTF tables as many as the number of OTF tables calculated in process (2) are selected from those generated in process (1).

(4) The OTF tables selected in process (3) are stored in the lens characteristic value memory 429.

In the fifth embodiment, the memory size of the lens characteristic value memory 429 can be reduced by sharing the OTF tables.

In addition, by changing the step sizes of wavelengths of OTF tables for respective OTF tables, the memory size of the lens characteristic value memory 429 can be reduced. In the example of the description of the first embodiment, OTF data are saved in the lens characteristic value memory 429 in correspondence with wavelengths having a step size of 10 nm in the wavelength range from 400 to 700 nm. However, the step size may be set to be that (e.g., 1 nm) smaller than the spectral transmittance characteristics of RGB filters. In this case, although each data amount is increased to 10 times, if both the data have a step size of 1 nm, more precise OTF data can be obtained, and the recovery process precision is improved. For example, by setting coarse step sizes for OTF tables corresponding to small data change amounts, and fine step sizes for OTF tables corresponding to large data change amounts, the memory size of the lens characteristic value memory 429 can be reduced as a whole.

Sixth Embodiment

An image process according to the sixth embodiment of the present invention will be described below. Note that the same reference numerals in the sixth embodiment denote the same components as in the first to fifth embodiments, and a detailed description thereof will not be repeated.

In the description of the example of FIGS. 10A and 10B in the first embodiment, the subsequent calculation amount can be reduced by extracting OTF data (MTF data) within a region sandwiched between Nyquist frequencies.

However, in order to generate a recovery filter having higher precision, OTF data equal to or higher than the Nyquist frequency often might as well be used. For example, by acquiring OTF data up to a frequency (sampling frequency) twice the Nyquist frequency, a recovery filter can be designed in consideration of an aliasing effect of frequencies that exceed the Nyquist frequency component.

Figure 18:
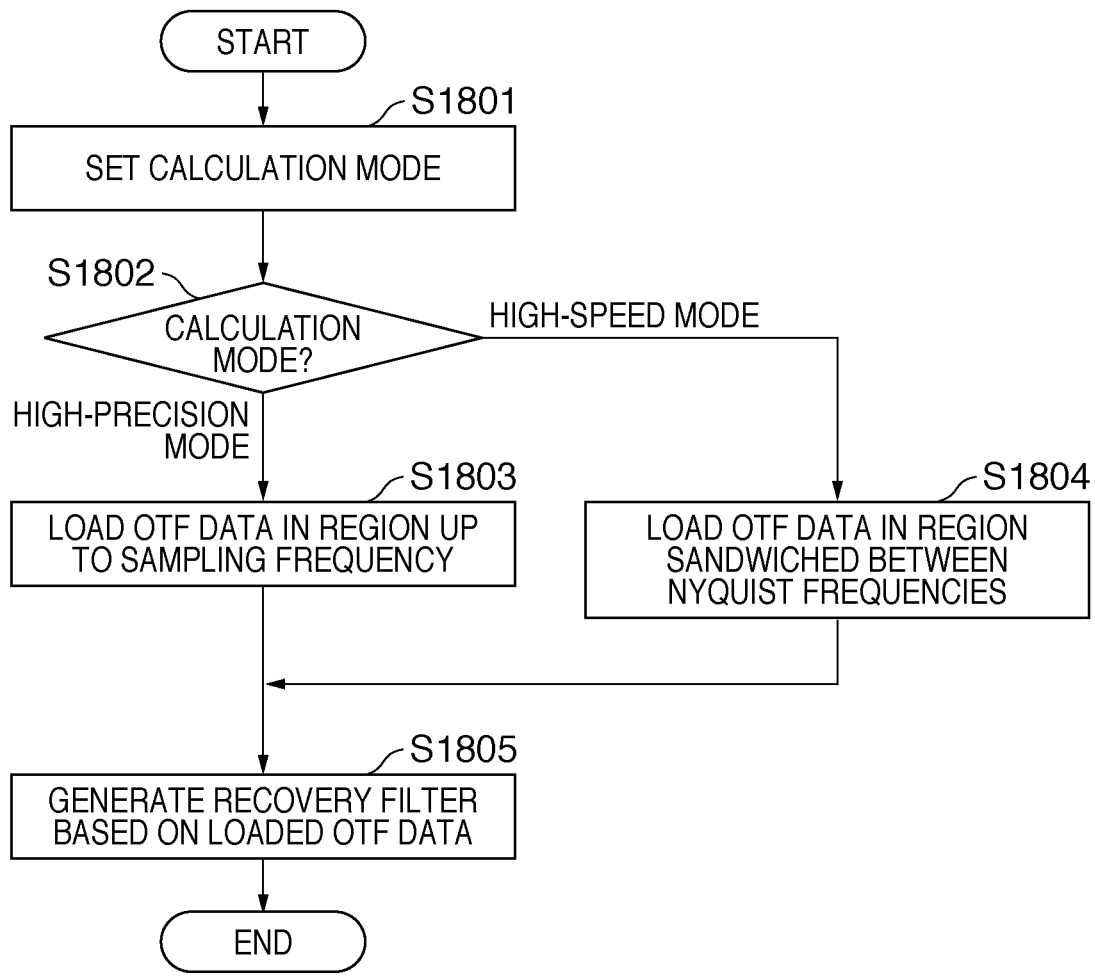
FIG. 18 is a flowchart for explaining a process for generating recovery filters according to the sixth embodiment.

FIG. 18 is a flowchart for explaining the process (S709) for generating recovery filters according to the sixth embodiment.

A recovery filter generator 430 sets a calculation mode based on a user's input or imaging conditions (e.g., a setting of a high-speed continuous shot mode) (S1801). The calculation mode includes a high-precision mode and high-speed mode. Then, the process branches depending on whether the set calculation mode is the high-precision or high-speed mode (S1802). If the high-precision mode is set, the recovery filter generator 430 loads OTF data up to the sampling frequency from a lens characteristic value memory 429 (S1803). On the other hand, if the high-speed mode is set, the recovery filter generator 430 loads OTF data within a region sandwiched between the Nyquist frequencies from the lens characteristic value memory 429 (S1804). Then, the recovery filter generator 430 generates recovery filters based on the OTF data loaded in step S1803 or S1804 (S1805).

With the aforementioned processes, a recovery filter can be generated according to a user's demand (as to whether or not to recover at a high speed or with high precision) and an image-capturing state (whether or not a high-speed continuous shot mode is set) upon execution of the recovery process.

Modification of Embodiments

In case of imaging lenses such as super-telephoto lenses incorporating switching filters, lens-setting information includes the types of switching filters. Then, the imaging lens holds OTF data according to respective switching filters in the lens characteristic value memory 429.

Furthermore, the lens-setting information may include the spectral transmittance characteristics of the imaging lens itself. In this case, upon generation of recovery filters, the products of the spectral transmittance characteristics of RGB filters of the camera body and those of the imaging lens are used in place of the spectral transmittance characteristics of the RGB filters.

An infrared cut filter or ultraviolet cut filter may often be laid out on the image capturing device. The spectral transmittance characteristics of these filters can be included in those of RGB filters of the camera body. Furthermore, the spectral transmittance characteristics of the RGB filters of the camera body can be held in consideration of the spectral sensitivity characteristics of the image capturing device.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-315031, filed Dec. 10, 2008, which is hereby incorporated by reference herein in its entirety.

The invention claimed is:

1. An image processing apparatus for an image capturing apparatus using an interchangeable imaging lens, the image processing apparatus comprising:
an input section, configured to input optical transfer information of the imaging lens from the imaging lens;
an acquisition section, configured to acquire characteristic information including a sensor pitch of an image capturing unit of the image capturing apparatus;
a converter, configured to convert the optical transfer information into optical transfer information depending on characteristics of the image capturing unit, based on the characteristic information so as to obtain the converted optical transfer information represented by a unit system of the sensor pitch different from a unit system of the optical transfer information of the imaging lens; and
a generator, configured to generate a correction filter, which corrects degradation of an image captured via the imaging lens, based on the optical transfer information depending on the characteristics of the image capturing unit.

2. The image processing apparatus according to claim 1, wherein the imaging lens outputs optical transfer information corresponding to lens setting information of the imaging lens.

3. The image processing apparatus according to claim 1, further comprising a transmitter configured to transmit lens setting information of the imaging lens to the imaging lens, wherein the imaging lens outputs optical transfer information corresponding to the received lens setting information.

4. The image processing apparatus according to claim 1, further comprising:
an output section, configured to selectively execute, according to an imaging mode of the image capturing apparatus, outputting of image data obtained by correcting degradation of an image captured via the imaging lens using the correction filter, or outputting of a file which saves the optical transfer information, the characteristic information, and capturing data captured via the imaging lens.

5. The image processing apparatus according to claim 4, wherein in a case where the imaging mode is a JPEG mode, the output section outputs image data corrected using a correction filter which is generated from optical transfer information common to lens settings of the imaging lens.

6. The image processing apparatus according to claim 4, wherein in a case where the imaging mode is a RAW mode, the output section outputs the file which saves optical transfer information according to a lens setting of the imaging lens.

7. A data processing apparatus for an interchangeable imaging lens of an image capturing apparatus, the data processing apparatus comprising:
a receiver, configured to receive characteristic information including a sensor pitch of an image capturing unit of the image capturing apparatus;
an acquisition section, configured to acquire optical transfer information according to a lens setting of the imaging lens;
a converter, configured to convert the optical transfer information into optical transfer information depending on characteristics of the image capturing unit, based on the characteristic information so as to obtain the converted optical transfer information represented by a unit system of the sensor pitch different from a unit system of the optical transfer information of the imaging lens;
a generator, configured to generate a correction filter, which corrects degradation of an image captured via the imaging lens, based on the optical transfer information depending on the characteristics of the image capturing unit; and
a transmitter, configured to transmit the correction filter to the image capturing apparatus.

8. A method of an image capturing apparatus using an interchangeable imaging lens, the method comprising:
using a processor to perform the steps of:
inputting optical transfer information of the imaging lens from the imaging lens;
acquiring characteristic information including a sensor pitch of an image capturing unit of the image capturing apparatus;
converting the optical transfer information into optical transfer information depending on characteristics of the image capturing unit, based on the characteristic information so as to obtain the converted optical transfer information represented by a unit system of the sensor pitch different from a unit system of the optical transfer information of the imaging lens; and
generating a correction filter, which corrects degradation of an image captured via the imaging lens, based on the optical transfer information depending on the characteristics of the image capturing unit.

9. A non-transitory computer-readable medium storing a computer-executable program for causing a processor to perform the method according to claim 8.

10. A method of a data processing apparatus for an interchangeable imaging lens of an image capturing apparatus, the method comprising:
using a processor to perform the steps of:
receiving characteristic information including a sensor pitch of an image capturing unit of the image capturing apparatus;
acquiring optical transfer information according to a lens setting of the imaging lens;
converting the optical transfer information into optical transfer information depending on characteristics of the image capturing unit, based on the characteristic information so as to obtain the converted optical transfer information represented by a unit system of the sensor pitch different from a unit system of the optical transfer information of the imaging lens;
generating a correction filter, which corrects degradation of an image captured via the imaging lens, based on the optical transfer information depending on the characteristics of the image capturing unit; and
transmitting the correction filter to the image capturing apparatus.

11. A non-transitory computer-readable medium storing a computer-executable program for causing a processor to perform the method according to claim 10.

12. An image processing apparatus for an image capturing apparatus using an interchangeable imaging lens, the image processing apparatus comprising:
an input unit configured to input optical transfer information of the imaging lens from the imaging lens;
an acquisition unit configured to acquire characteristic information of an image capturing unit of the image capturing apparatus, wherein the characteristic information includes a filter spectral transmittance corresponding to a plurality of colors;

a conversion unit configured to convert the optical transfer information into optical transfer information depending on characteristics of the image capturing unit, based on the filter spectral transmittance and the optical transfer information so as to obtain the converted optical transfer information corresponding to the plurality of colors; and a generation unit configured to generate a correction filter, which corrects degradation of an image captured via the imaging lens, based on the optical transfer information depending on the characteristics of the image capturing unit.

13. An image processing apparatus for an image capturing apparatus using an interchangeable imaging lens, the image processing apparatus comprising:

an input unit configured to input optical transfer information of the imaging lens from the imaging lens;

an acquisition unit configured to acquire characteristic information including an optical low-pass filter characteristic of an image capturing unit of the image capturing apparatus;

a conversion unit configured to convert the optical transfer information into optical transfer information depending on characteristics of the image capturing unit, based on the optical low-pass filter characteristic and the optical transfer information so as to obtain the converted optical transfer information limited to a wavelength received by the image capturing unit; and a generation unit configured to generate a correction filter, which corrects degradation of an image captured via the imaging lens, based on the optical transfer information depending on the characteristics of the image capturing unit.

14. A data processing apparatus for an interchangeable imaging lens of an image capturing apparatus, the data processing apparatus comprising:

a reception unit configured to receive characteristic information of an image capturing unit of the image capturing apparatus, wherein the characteristic information includes a filter spectral transmittance corresponding to a plurality of colors;

an acquisition unit configured to acquire optical transfer information according to a lens setting of the imaging lens;

a conversion unit configured to convert the optical transfer information into optical transfer information depending on characteristics of the image capturing unit, based on the filter spectral transmittance and the optical transfer information so as to obtain the converted optical transfer information corresponding to the plurality of colors;

a generation unit configured to generate a correction filter, which corrects degradation of an image captured via the imaging lens, based on the optical transfer information depending on the characteristics of the image capturing unit; and a transmitter, configured to transmit the correction filter to the image capturing apparatus.

15. A data processing apparatus for an interchangeable imaging lens of an image capturing apparatus, the data processing apparatus comprising:

a reception unit configured to receive characteristic information including an optical low-pass filer characteristic of an image capturing unit of the image capturing apparatus;

an acquisition unit configured to acquire optical transfer information according to a lens setting of the imaging lens;

a conversion unit configured to convert the optical transfer information into optical transfer information depending on characteristics of the image capturing unit, based on the optical low-pass filter characteristic and the optical transfer information so as to obtain the converted optical transfer information limited to a wavelength received by the image capturing unit;

a generation unit configured to generate a correction filter, which corrects degradation of an image captured via the imaging lens, based on the optical transfer information depending on the characteristics of the image capturing unit; and a transmitter, configured to transmit the correction filter to the image capturing apparatus.

16. A method of a data processing apparatus for an interchangeable imaging lens of an image capturing apparatus, the method comprising:

using a processor to perform the steps of:

receiving characteristic information of an image capturing unit of the image capturing apparatus, wherein the characteristic information includes a filter spectral transmittance corresponding to a plurality of colors;

acquiring optical transfer information according to a lens setting of the imaging lens;

converting the optical transfer information into optical transfer information depending on characteristics of the image capturing unit, based on the filter spectral transmittance and the optical transfer information so as to obtain the converted optical transfer information corresponding to the plurality of colors;

generating a correction filter, which corrects degradation of an image captured via the imaging lens, based on the optical transfer information depending on the characteristics of the image capturing unit; and transmitting the correction filter to the image capturing apparatus.

17. A non-transitory computer readable medium storing a computer-executable program for causing a computer to perform the method according to claim 16.

18. A method of a data processing apparatus for an interchangeable imaging lens of an image capturing apparatus, the method comprising:

using a processor to perform the steps of:

receiving characteristic information including an optical low-pass filer characteristic of an image capturing unit of the image capturing apparatus;

acquiring optical transfer information according to a lens setting of the imaging lens;

converting the optical transfer information into optical transfer information depending on characteristics of the image capturing unit, based on the optical low-pass filter characteristic and the optical transfer information so as to obtain the converted optical transfer information limited to a wavelength received by the image capturing unit;

generating a correction filter, which corrects degradation of an image captured via the imaging lens, based on the optical transfer information depending on the characteristics of the image capturing unit; and transmitting the correction filter to the image capturing apparatus.

19. A non-transitory computer readable medium storing a computer-executable program for causing a computer to perform the method according to claim 18.

* * * * *